United States Patent
Cui et al.

(10) Patent No.: US 12,430,802 B2
(45) Date of Patent: Sep. 30, 2025

(54) CALIBRATING A CAMERA FOR MAPPING IMAGE PIXELS TO GRID POINTS IN A STORAGE SYSTEM

(71) Applicant: Ocado Innovation Limited, Hatfield (GB)

(72) Inventors: Xiaokai Cui, Hatfield (GB); Christopher Pearman, Hatfield (GB); Jonathan Schuchart, Hatfield (GB)

(73) Assignee: Ocado Innovation Limited, Hatfield (GB)

( * ) Notice: Subject to any disclaimer, the term of this patent is extended or adjusted under 35 U.S.C. 154(b) by 0 days.

(21) Appl. No.: 18/713,075

(22) PCT Filed: Nov. 25, 2022

(86) PCT No.: PCT/EP2022/083366
§ 371 (c)(1),
(2) Date: May 23, 2024

(87) PCT Pub. No.: WO2023/094635
PCT Pub. Date: Jun. 1, 2023

(65) Prior Publication Data
US 2025/0037310 A1    Jan. 30, 2025

(30) Foreign Application Priority Data
Nov. 26, 2021 (GB) ................... 2117102

(51) Int. Cl.
*G06T 7/80* (2017.01)

(52) U.S. Cl.
CPC ...... *G06T 7/80* (2017.01); *G06T 2207/20084* (2013.01); *G06T 2207/30204* (2013.01)

(58) Field of Classification Search
CPC ............ G06T 7/80; G06T 2207/20084; G06T 2207/30204; G06T 2207/20081;
(Continued)

(56) References Cited

U.S. PATENT DOCUMENTS

| | | | | |
|---|---|---|---|---|
| 5,979,633 A | * | 11/1999 | Bonnet | B65G 19/02 198/370.09 |
| 2012/0033873 A1 | * | 2/2012 | Ozeki | G06V 20/653 382/154 |

(Continued)

FOREIGN PATENT DOCUMENTS

| | | |
|---|---|---|
| CN | 101685532 A | 3/2010 |
| CN | 112991216 A | 6/2021 |

(Continued)

OTHER PUBLICATIONS

International Search Report and Written Opinion, dated Mar. 9, 2023, for International Patent Application No. PCT/EP2022/083366. (15 pages).

(Continued)

*Primary Examiner* — Marnie A Matt
(74) *Attorney, Agent, or Firm* — Seed Intellectual Property Law Group LLP

(57) ABSTRACT

A method and system for calibrating a wide-angle or ultra wide-angle camera disposed above a grid of a storage system. An image of a grid section and initial values of a plurality of parameters corresponding to the camera are obtained. The image is processed, using a neural network trained to detect/predict sets of parallel tracks in images of grid sections captured by wide-angle or ultra wide-angle cameras, to generate a model of the sets of parallel tracks as captured in the image. Selected pixels in the model are mapped to corresponding points on the grid using a mapping based on the plurality of parameters, with the initial values used as inputs to the mapping. An error function is determined based on a discrepancy between mapped grid coordinates of the points and known grid coordinates. The initial values of the parameters are updated based on the error function and the updated values are stored for mapping (Continued)

pixels in images of the grid section captured by the camera to corresponding points on the grid of the storage system.

25 Claims, 16 Drawing Sheets

(58) Field of Classification Search
CPC ... G06T 2207/30108; G06T 7/10; G06T 7/13; G06T 3/047; G06T 5/80; G06T 7/11; G06N 3/02; G06N 3/08
USPC .......................................................... 348/36
See application file for complete search history.

(56) References Cited

U.S. PATENT DOCUMENTS

| | | | | |
|---|---|---|---|---|
| 2012/0133780 A1* | 5/2012 | Zhang | .................. | H04N 17/002 348/E17.002 |
| 2021/0006718 A1* | 1/2021 | Chen | .................. | H04N 23/689 |
| 2024/0208726 A1* | 6/2024 | Lindbo | .................. | G06Q 10/08 |
| 2025/0136375 A1* | 5/2025 | Stadie | .................. | G05D 1/0289 |

FOREIGN PATENT DOCUMENTS

| | | |
|---|---|---|
| KR | 20210114238 A | 9/2021 |
| WO | 98/49076 A2 | 11/1998 |
| WO | 2015/019055 A1 | 2/2015 |
| WO | 2015/185628 A2 | 12/2015 |

OTHER PUBLICATIONS

Office Action dated May 25, 2023, for European Patent Application Noo. GB2217695.2. (4 pages).

Office Action, dated Aug. 3, 2022, for European Patent Application No. GB2117102.0. (10 pages).

Yan et al., "Calibration of Camera Intrinsic Parameters Using a Single Image", Robotics and Artificial Intelligence, ACM, New York, NY, Dec. 29, 2017, pp. 39-45. (7 pages).

Zhang et al., "Line-Based Geometric Consensus Rectification and Calibration From Single Distorted Manhattan Image" *IEEE Access* 7:156400-156412, Oct. 14, 2019. (13 pages).

* cited by examiner

CALIBRATING A CAMERA FOR MAPPING IMAGE PIXELS TO GRID POINTS IN A STORAGE SYSTEM

TECHNICAL FIELD

The present disclosure generally relates to the field of a storage or fulfilment system in which stacks of bins or containers are arranged within a grid framework structure, and more specifically, to calibrating a wide-angle or ultra wide-angle camera disposed above the grid framework structure.

BACKGROUND

Online retail businesses selling multiple product lines, such as online grocers and supermarkets, require systems that can store tens or hundreds of thousands of different product lines. The use of single-product stacks in such cases can be impractical since a vast floor area would be required to accommodate all of the stacks required. Furthermore, it can be desirable to store small quantities of some items, such as perishables or infrequently ordered goods, making single-product stacks an inefficient solution.

International patent application WO 98/049076A (Autostore), the contents of which are incorporated herein by reference, describes a system in which multi-product stacks of containers are arranged within a frame structure.

PCT Publication No. WO2015/185628A (Ocado) describes a further known storage and fulfilment system in which stacks of containers are arranged within a grid framework structure. The containers are accessed by one or more load handling devices, otherwise known as "bots", operative on tracks located on the top of the grid framework structure. A system of this type is illustrated schematically in FIGS. 1 to 3 of the accompanying drawings.

As shown in FIGS. 1 and 2, stackable containers 10, also known as "bins", are stacked on top of one another to form stacks 12. The stacks 12 are arranged in a grid framework structure 14, e.g. in a warehousing or manufacturing environment. The grid framework structure 14 is made up of a plurality of storage columns or grid columns. Each grid in the grid framework structure has at least one grid column to store a stack of containers. FIG. 1 is a schematic perspective view of the grid framework structure 14, and FIG. 2 is a schematic top-down view showing a stack 12 of bins 10 arranged within the framework structure 14. Each bin 10 typically holds a plurality of product items (not shown). The product items within a bin 10 may be identical or different product types depending on the application.

The grid framework structure 14 comprises a plurality of upright members 16 that support horizontal members 18, 20. A first set of parallel horizontal grid members 18 is arranged perpendicularly to a second set of parallel horizontal members 20 in a grid pattern to form a horizontal grid structure 15 supported by the upright members 16. The members 16, 18, 20 are typically manufactured from metal. The bins 10 are stacked between the members 16, 18, 20 of the grid framework structure 14, so that the grid framework structure 14 guards against horizontal movement of the stacks 12 of bins 10 and guides the vertical movement of the bins 10.

The top level of the grid framework structure 14 comprises a grid or grid structure 15, including rails 22 arranged in a grid pattern across the top of the stacks 12. Referring to FIG. 3, the rails or tracks 22 guide a plurality of load handling devices 30. A first set 22a of parallel rails 22 guides movement of the robotic load handling devices 30 in a first direction (e.g. an X-direction) across the top of the grid framework structure 14. A second set 22b of parallel rails 22, arranged perpendicular to the first set 22a, guides movement of the load handling devices 30 in a second direction (e.g. a Y-direction), perpendicular to the first direction. In this way, the rails 22 allow the robotic load handling devices 30 to move laterally in two dimensions in the horizontal X-Y plane. A load handling device 30 can be moved into position above any of the stacks 12.

A known form of load handling device 30—shown in FIGS. 4, 5, 6A and 6B—is described in PCT Patent Publication No. WO2015/019055 (Ocado), hereby incorporated by reference, where each load handling device 30 covers a single grid space 17 of the grid framework structure 14. This arrangement allows a higher density of load handlers and thus a higher throughput for a given sized storage system.

The example load handling device 30 comprises a vehicle 32, which is arranged to travel on the rails 22 of the frame structure 14. A first set of wheels 34, consisting of a pair of wheels 34 at the front of the vehicle 32 and a pair of wheels 34 at the back of the vehicle 32, is arranged to engage with two adjacent rails of the first set 22a of rails 22. Similarly, a second set of wheels 36, consisting of a pair of wheels 36 at each side of the vehicle 32, is arranged to engage with two adjacent rails of the second set 22b of rails 22. Each set of wheels 34, 36 can be lifted and lowered so that either the first set of wheels 34 or the second set of wheels 36 is engaged with the respective set of rails 22a, 22b at any one time during movement of the load handling device 30. For example, when the first set of wheels 34 is engaged with the first set of rails 22a and the second set of wheels 36 is lifted clear from the rails 22, the first set of wheels 34 can be driven, by way of a drive mechanism (not shown) housed in the vehicle 32, to move the load handling device 30 in the X-direction. To achieve movement in the Y-direction, the first set of wheels 34 is lifted clear of the rails 22, and the second set of wheels 36 is lowered into engagement with the second set 22b of rails 22. The drive mechanism can then be used to drive the second set of wheels 36 to move the load handling device 30 in the Y-direction.

The load handling device 30 is equipped with a lifting mechanism, e.g. a crane mechanism, to lift a storage container from above. The lifting mechanism comprises a winch tether or cable 38 wound on a spool or reel (not shown) and a gripper device 39. The lifting mechanism shown in FIG. 5 comprises a set of four lifting tethers 38 extending in a vertical direction. The tethers 38 are connected at or near the respective four corners of the gripper device 39, e.g. a lifting frame, for releasable connection to a storage container 10. For example, a respective tether 38 is arranged at or near each of the four corners of the lifting frame 39. The gripper device 39 is configured to releasably grip the top of a storage container 10 to lift it from a stack of containers in a storage system 1 of the type shown in FIGS. 1 and 2. For example, the lifting frame 39 may include pins (not shown) that mate with corresponding holes (not shown) in the rim that forms the top surface of bin 10, and sliding clips (not shown) that are engageable with the rim to grip the bin 10. The clips are driven to engage with the bin 10 by a suitable drive mechanism housed within the lifting frame 39, powered and controlled by signals carried through the cables 38 themselves or a separate control cable (not shown).

To remove a bin 10 from the top of a stack 12, the load handling device 30 is first moved in the X- and Y-directions to position the gripper device 39 above the stack 12. The gripper device 39 is then lowered vertically in the Z-direction to engage with the bin 10 on the top of the stack 12, as shown in FIGS. 4 and 6B. The gripper device 39 grips the bin 10, and is then pulled upwards by the cables 38, with the bin 10 attached. At the top of its vertical travel, the bin 10 is held above the rails 22 accommodated within the vehicle body 32. In this way, the load handling device 30 can be moved to a different position in the X-Y plane, carrying the bin 10 along with it, to transport the bin 10 to another location. On reaching the target location (e.g. another stack 12, an access point in the storage system, or a conveyor belt) the bin or container 10 can be lowered from the container receiving portion and released from the grabber device 39. The cables 38 are long enough to allow the load handling device 30 to retrieve and place bins from any level of a stack 12, e.g. including the floor level.

As shown in FIG. 3, a plurality of identical load handling devices 30 is provided so that each load handling device 30 can operate simultaneously to increase the system's throughput. The system illustrated in FIG. 3 may include specific locations, known as ports, at which bins 10 can be transferred into or out of the system. An additional conveyor system (not shown) is associated with each port so that bins 10 transported to a port by a load handling device 30 can be transferred to another location by the conveyor system, such as a picking station (not shown). Similarly, bins 10 can be moved by the conveyor system to a port from an external location, for example, to a bin-filling station (not shown), and transported to a stack 12 by the load handling devices 30 to replenish the stock in the system.

Each load handling device 30 can lift and move one bin 10 at a time. The load handling device 30 has a container-receiving cavity or recess 40, in its lower part. The recess 40 is sized to accommodate the container 10 when lifted by the lifting mechanism 38, 39, as shown in FIGS. 6A and 6B. When in the recess, the container 10 is lifted clear of the rails 22 beneath, so that the vehicle 32 can move laterally to a different grid location.

If it is necessary to retrieve a bin 10b ("target bin") that is not located on the top of a stack 12, then the overlying bins 10a ("non-target bins") must first be moved to allow access to the target bin 10b. This is achieved by an operation referred to hereafter as "digging". Referring to FIG. 3, during a digging operation, one of the load handling devices 30 lifts each non-target bin 10a sequentially from the stack 12 containing the target bin 10b and places it in a vacant position within another stack 12. The target bin 10b can then be accessed by the load handling device 30 and moved to a port for further transportation.

Each load handling device 30 is remotely operable under the control of a central computer, e.g. a master controller. Each individual bin 10 in the system is also tracked so that the appropriate bins 10 can be retrieved, transported and replaced as necessary. For example, during a digging operation, each non-target bin location is logged so that the non-target bin 10a can be tracked.

Wireless communications and networks may be used to provide the communication infrastructure from the master controller, e.g. via one or more base stations, to one or more load handling devices 30 operative on the grid structure 15. In response to receiving instructions from the master controller, a controller in the load handling device 30 is configured to control various driving mechanisms to control the movement of the load handling device.

For example, the load handling device 30 may be instructed to retrieve a container from a target storage column at a particular location on the grid structure 15. The instruction can include various movements in the X-Y plane of the grid structure 15. As previously described, once at the target storage column, the lifting mechanism 38, 39 can be operated to grip and lift the storage container 10. Once the container 10 is accommodated in the container-receiving space 40 of the load handling device 30, it is subsequently transported to another location on the grid structure 15, e.g. a "drop-off port". At the drop-off port, the container 10 is lowered to a suitable pick station to allow retrieval of any item in the storage container. Movement of the load handling devices 30 on the grid structure 15 can also involve the load handling devices 30 being instructed to move to a charging station, usually located at the periphery of the grid structure 15.

To manoeuvre the load handling devices 30 on the grid structure 15, each of the load handling devices 30 is equipped with motors for driving the wheels 34, 36. The wheels 34, 36 may be driven via one or more belts connected to the wheels or driven individually by a motor integrated into the wheels. For a single-cell load handling device (where the footprint of the load handling device 30 occupies a single grid cell 17), and the motors for driving the wheels can be integrated into the wheels due to the limited availability of space within the vehicle body. For example, the wheels of a single-cell load handling device 30 are driven by respective hub motors. Each hub motor comprises an outer rotor with a plurality of permanent magnets arranged to rotate about a wheel hub comprising coils forming an inner stator.

The system described with reference to FIGS. 1 to 6B has many advantages and is suitable for a wide range of storage and retrieval operations. In particular, it allows very dense storage of products and provides a very economical way of storing a wide range of different items in the bins 10 while also allowing reasonably economical access to all of the bins 10 when required for picking.

It is, however, an object of the present disclosure to provide methods and systems for reliably determining the correct location of a load handling device operated remotely in a storage system.

SUMMARY

There is provided a method of calibrating a wide-angle or ultra wide-angle camera disposed above a grid of a storage system, wherein the grid is formed by a first set of parallel tracks extending in an X-direction, and a second set of parallel tracks extending in a Y-direction transverse to the first set in a substantially horizontal plane, the grid comprising a plurality of grid spaces and arranged to support one or more transport devices, selectively movable in at least one of the X-direction or Y-direction on the tracks, for handling a container stacked beneath the tracks within a footprint of a single grid space. The method comprises: obtaining an image of a grid section of the grid captured by the camera; obtaining initial values of a plurality of parameters corresponding to the camera, the plurality of parameters including a focal length of the camera, a translational vector representative of a position of the camera above the grid section, and a rotational vector representative of a tilt and rotation of the camera; processing the image, using a neural network trained to detect/predict the first and second sets of parallel tracks in images of grid sections captured by wide-angle or ultra wide-angle cameras, to generate a model of the first and second sets of parallel tracks as captured in the image of the grid section; mapping selected pixels in the model to corresponding points on the grid using a mapping based on the plurality of parameters, wherein the initial values are used as inputs to the mapping; determining an error function based on a discrepancy between grid coordinates of the points determined by the mapping and known grid coordinates; updating the initial values to updated values of the plurality of parameters based on the error function; and storing the updated values of the plurality of parameters for mapping pixels in images of the grid section captured by the camera to corresponding points on the grid of the storage system via the mapping.

Also provided is a data processing apparatus comprising a processor configured to perform the method. Also provided is a computer program comprising instructions which, when the program is executed by a computer, cause the computer to carry out the method. Similarly, a computer-readable storage medium is provided which comprises instructions that, when executed by a computer, cause the computer to carry out the method.

Further provided is a calibration system for calibrating a wide-angle or ultra wide-angle camera disposed above a grid of a storage system, wherein the grid is formed by a first set of parallel tracks extending in an X-direction, and a second set of parallel tracks extending in a Y-direction transverse to the first set in a substantially horizontal plane, the grid comprising a plurality of grid spaces and arranged to support one or more transport devices, selectively movable in at least one of the X-direction or Y-direction on the tracks, for handling a container stacked beneath the tracks within a footprint of a single grid space. The calibration system comprises: at least one interface to obtain an image of a grid section of the grid captured by the camera, and obtain initial values of a plurality of parameters corresponding to the camera, the plurality of parameters including a focal length of the camera, a translational vector representative of a position of the camera above the grid section, and a rotational vector representative of a tilt and rotation of the camera; and at least one processor configured to: process the image, using a neural network trained to detect/predict the first and second sets of parallel tracks in images of grid sections captured by wide-angle or ultra wide-angle cameras, to generate a model of the first and second sets of parallel tracks as captured in the image of the grid section; map pixels in the model to corresponding points on the grid using a mapping based on the plurality of parameters, wherein the initial values are used as inputs to the mapping; determine an error function based on a discrepancy between grid coordinates of the points determined by the mapping and known grid coordinates; update the initial values to updated values of the plurality of parameters based on the error function; and output the updated values of the plurality of parameters to storage for mapping pixels in images of the grid section captured by the camera to corresponding points on the grid of the storage system via the mapping.

In general terms, this description introduces systems and methods to calibrate a wide-angle or ultra wide-angle camera above a workspace of a storage system. The calibration allows for interaction with the images captured by the camera, which are distorted by the wide-angle or ultra wide-angle-angle lens, to be mapped correctly to the workspace. Thus, selected areas of pixels in the distorted images can be mapped to corresponding areas of grid spaces in the workspace, for example. For example, calibrating a wide-angle or ultra wide-angle camera using the systems and methods described herein allows for images captured by the camera with a wide field of view of the workspace to be used to detect and localise transport devices operating thereon. This is despite the relatively high distortion present in the images compared to those of other camera types.

BRIEF DESCRIPTION OF THE DRAWINGS

Embodiments will now be described by way of example only with reference to the accompanying drawings, in which like reference numbers designate the same or corresponding parts, and in which.

DETAILED DESCRIPTION

Figure 1:
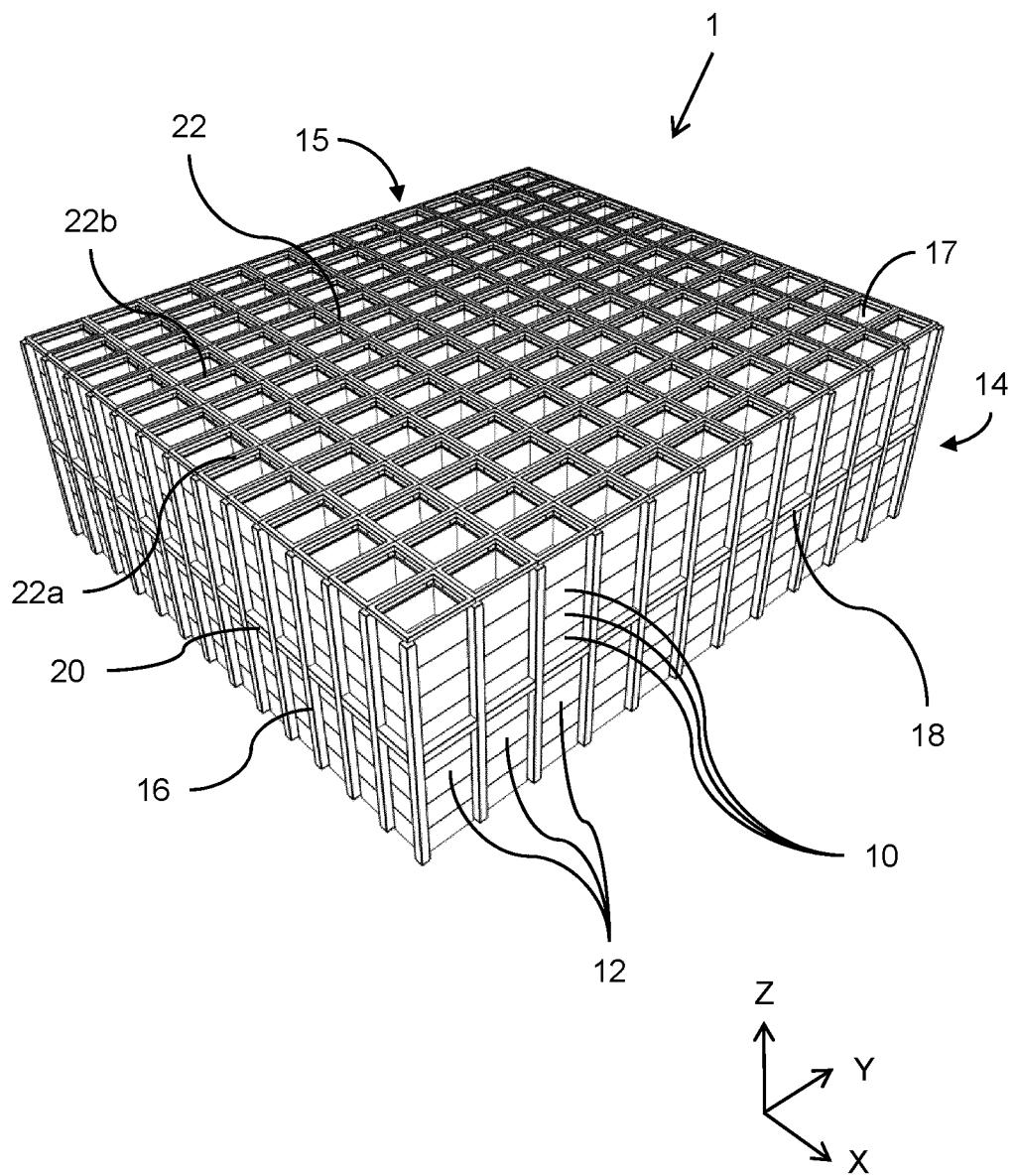
FIG. 1 is a schematic diagram of a grid framework structure according to a known system.
Figure 2:
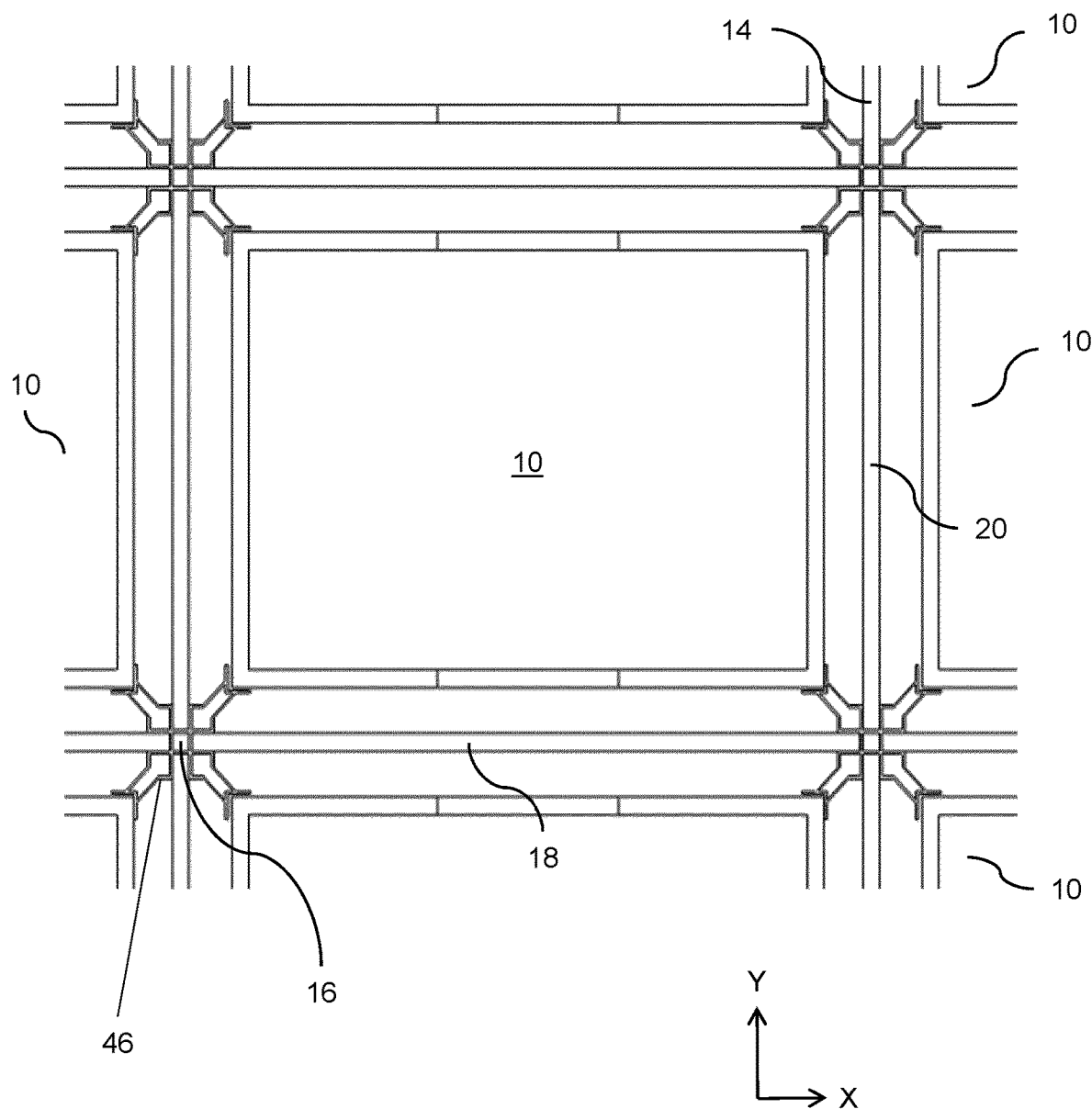
FIG. 2 is a schematic diagram of a top-down view showing a stack of bins arranged within the framework structure of FIG. 1.
Figure 3:
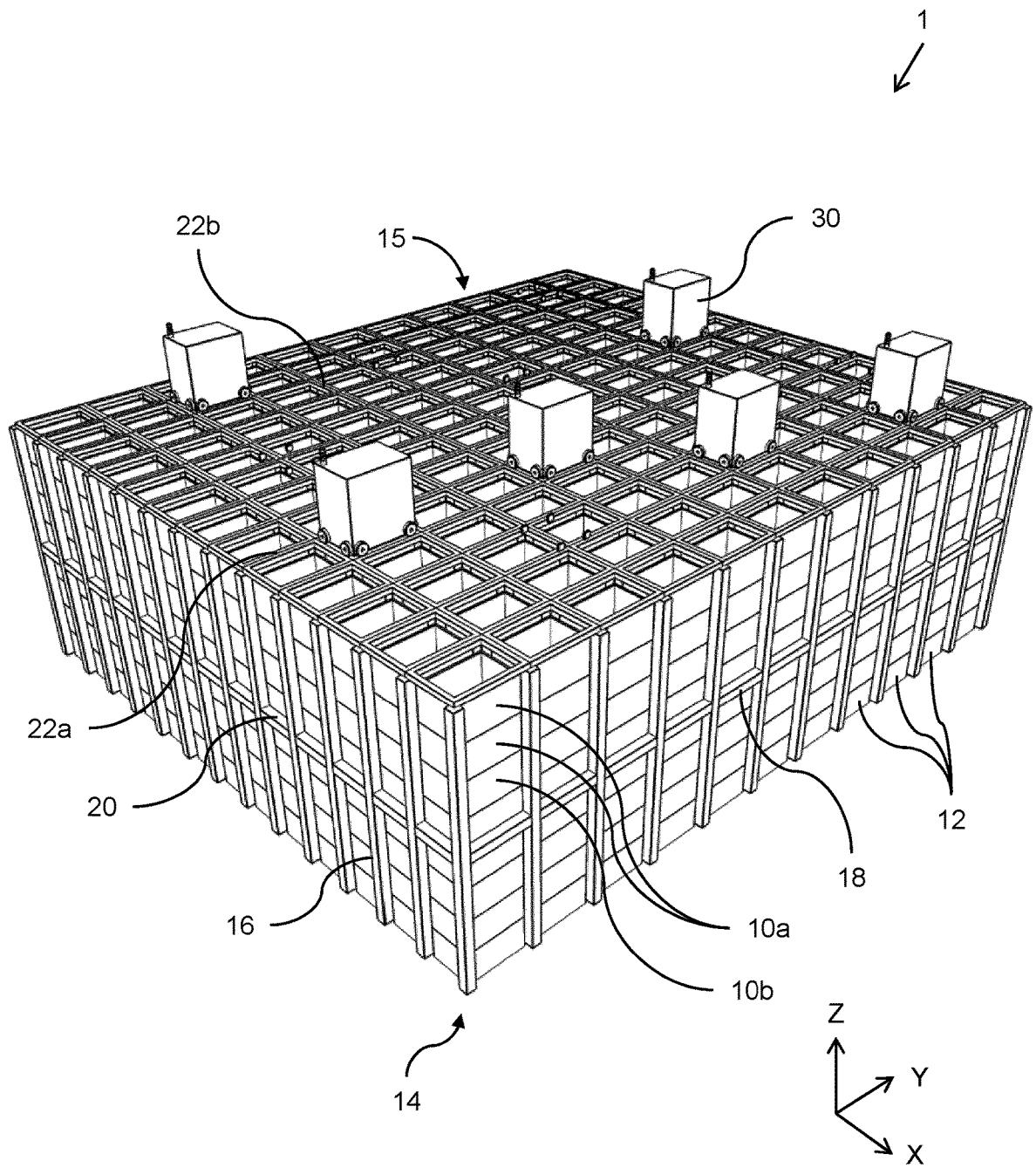
FIG. 3 is a schematic diagram of a known storage system showing load handling devices operative on the grid framework structure.
Figure 4:
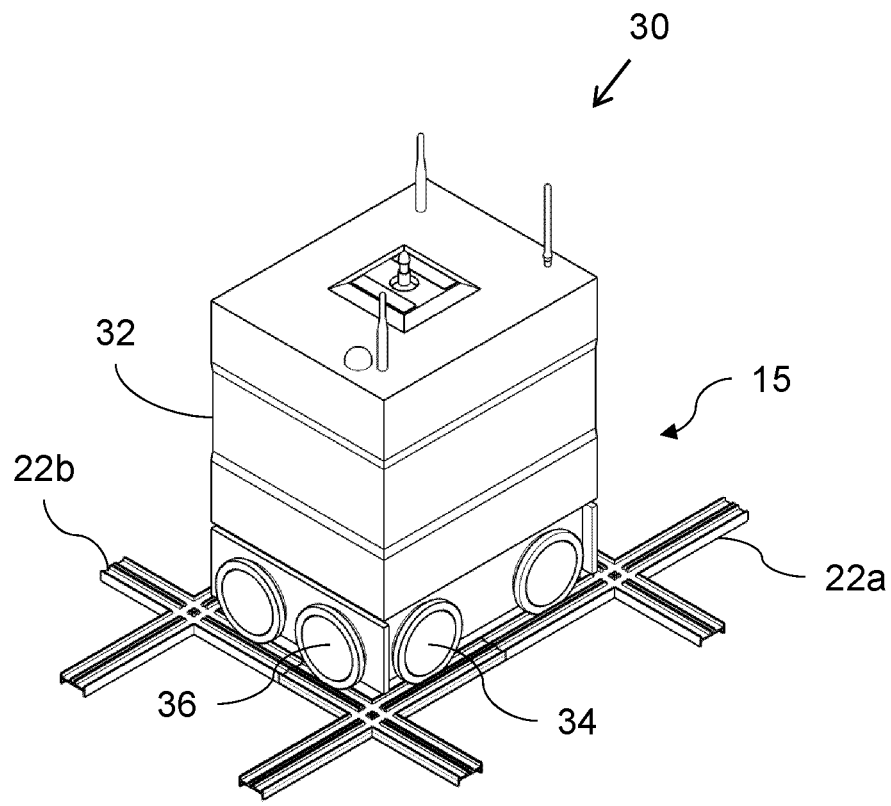
FIG. 4 is a schematic perspective view of a load handling device on a portion of the grid framework structure.
Figure 5:
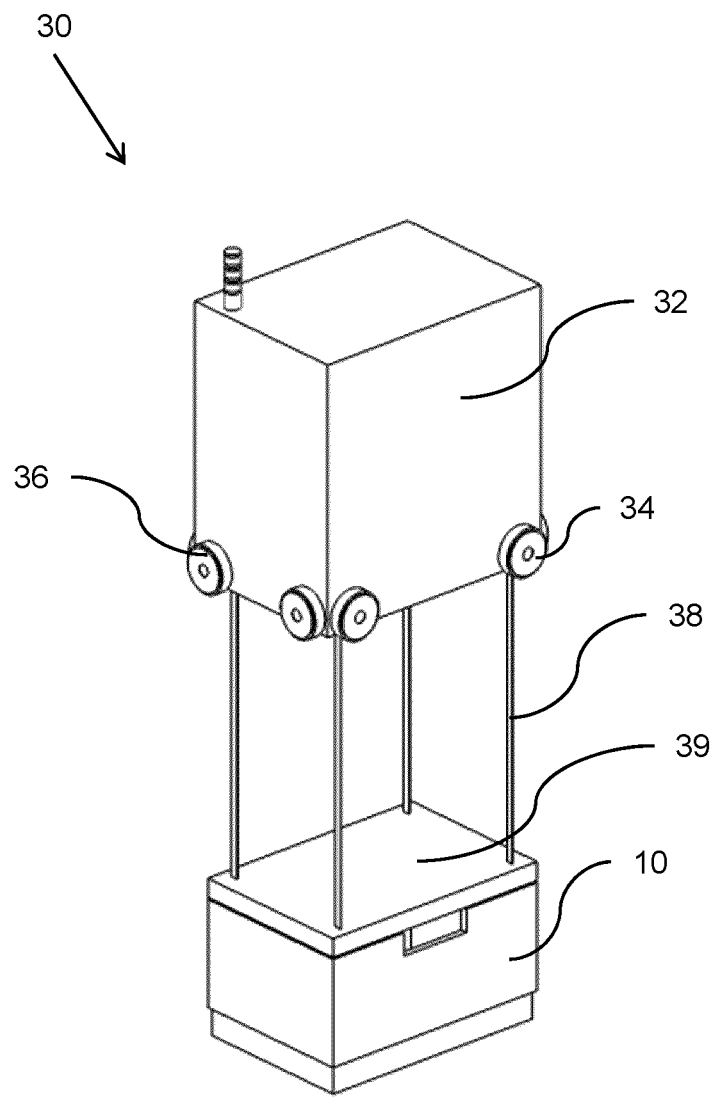
FIG. 5 is a schematic perspective view of a load handling device showing the lifting mechanism gripping a container from above.
Figure 6A:
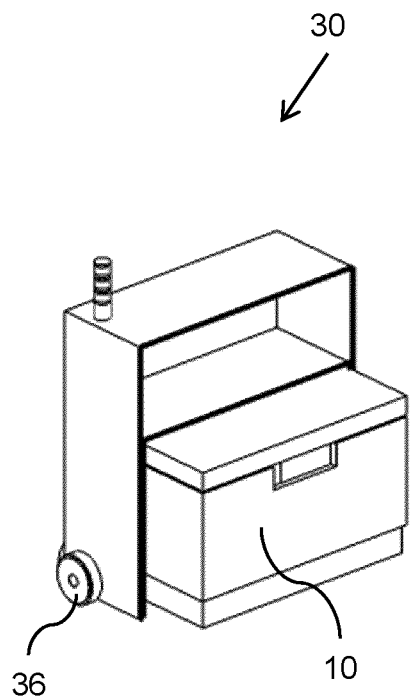
FIGS. 6A and 6B are schematic perspective cutaway views of the load handling device of FIG. 5 showing the container receiving space of the load handling device and how it accommodates a container in use.
Figure 6B:
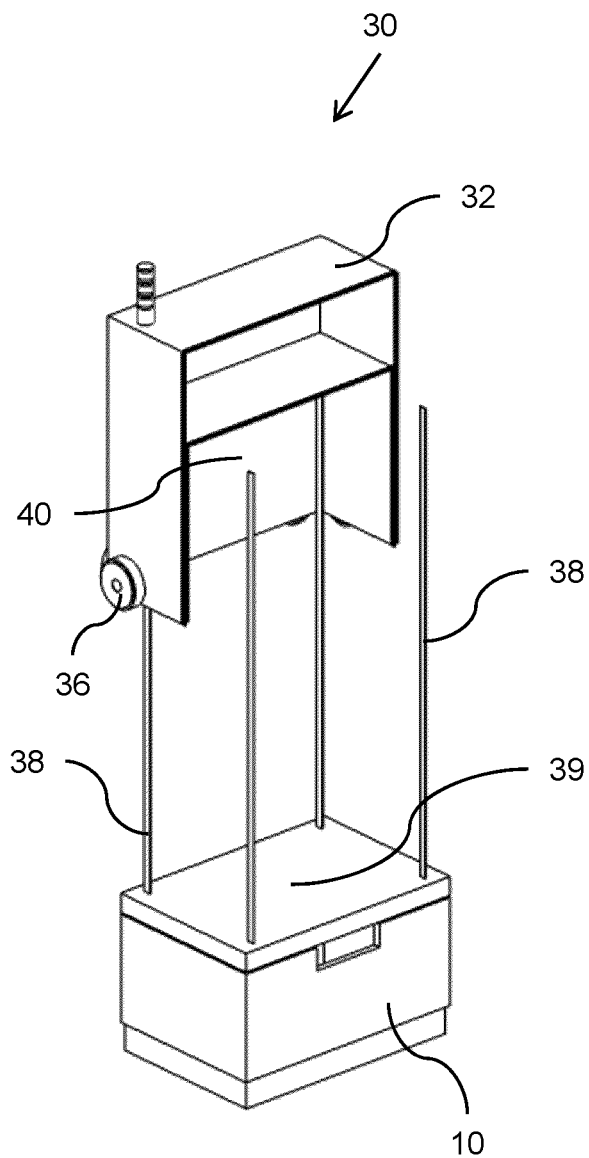

In storage systems of the type shown in FIGS. 1 to 3, it is useful to determine a position of a given load handling device 30 operating on the grid structure 15 independently from the master controller. Each load handling device 30 is sent control signals from the master controller to move along a predetermined path from one location to another on the grid structure. For example, a given load handling device 30 may be instructed to move to a particular location on the grid structure 15 to lift a target container from the stack of containers at that particular location. With multiple such devices 30 moving along respective trajectories on the grid structure 15, it is useful to be able to determine an accurate position of a given load handling device 30 relative to the grid structure 15, e.g. in the event that communication between the given load handling device and the master controller is lost. For example, a collision between a load handling device and another object, e.g. another load handling device, on or around the grid structure could cause the, or each, load handling device to become unresponsive to communications from the master controller, e.g. through loss of connection thereto, and/or disengagement from the tracks 22 of the grid structure 15. A collision may result in one or more load handling devices misaligning with the tracks 22 or toppling over on the grid structure, for example.

Monitoring the grid structure 15 and the load handling devices 30 moving thereon can allow for such instances of unresponsiveness of a load handling device to be detected and/or acted on to resolve operation of the multiple load handling devices. Having an independent evaluation of the position of a given load handling device 30 relative to the grid structure 15 can be useful for other technical purposes too, e.g. monitoring predetermined trajectories of load handling devices 30 on the grid structure 15 against the true position thereof.

Figure 7:
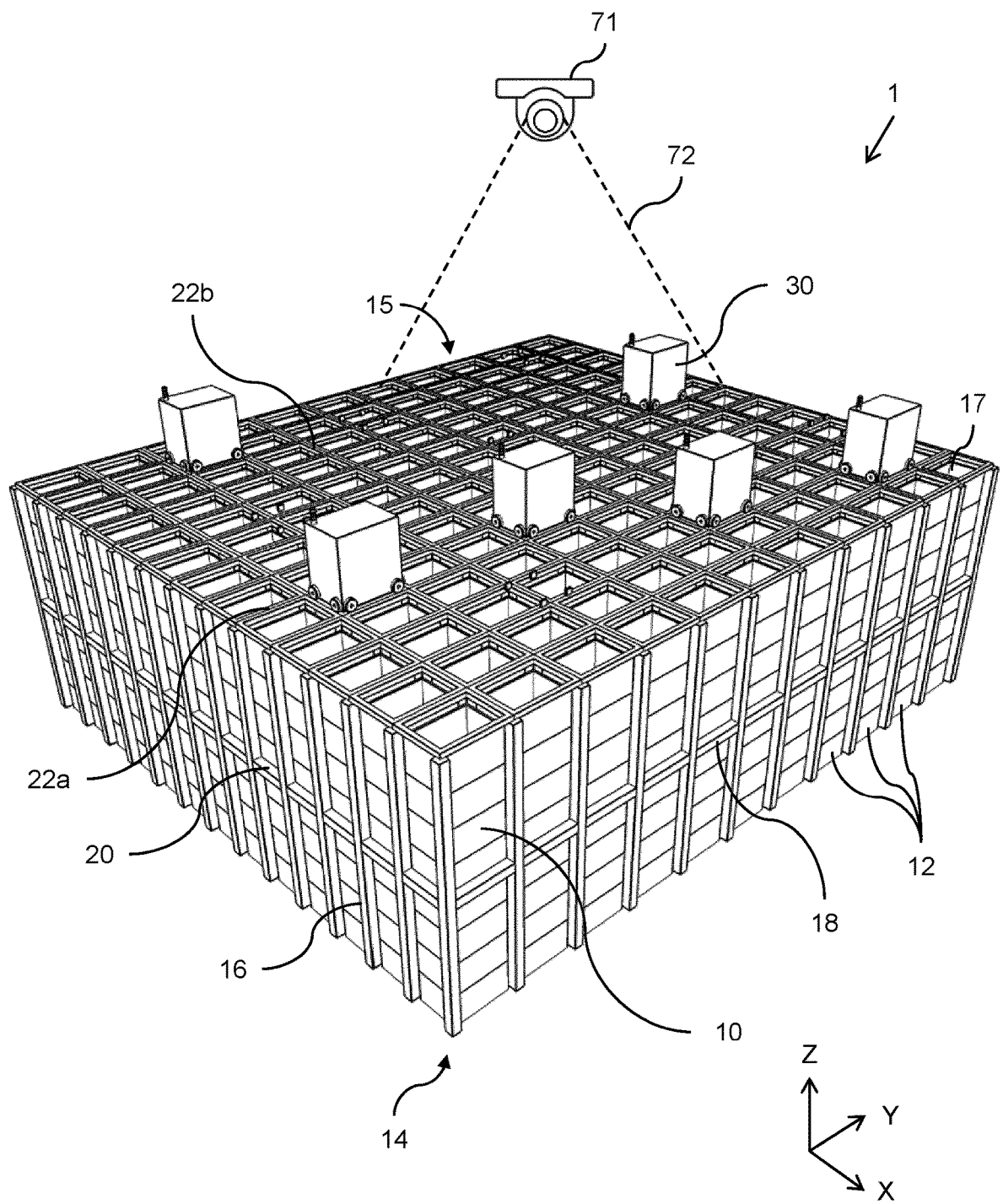
FIG. 7 is a schematic diagram of a storage system, showing load handling devices operative on the grid framework structure with a camera positioned above the grid framework structure, according to embodiments.

FIG. 7 shows the grid structure (or simply "grid") 15 of a storage system, as previously described. The grid is formed by a first set of parallel tracks 22a extending in an X-direction and a second set of parallel tracks 22b extending in a Y-direction, transverse to the first set in a substantially horizontal plane. The grid 15 has a plurality of grid spaces 17. The one or more load handling devices, or "transport devices" 30, are arranged to selectively move in at least one of the X-direction or Y-direction on the tracks 22, and to handle a container 10 stacked beneath the tracks 22 within a footprint of a single grid space 17. In examples, the one or more transport devices 30 each has a footprint that also occupies only a single grid space, such that a given transport device occupying one grid space does not obstruct another transport device occupying or traversing adjacent grid spaces.

Disposed above the grid 15 is a camera 71. In examples, the camera 71 is an ultra wide-angle camera, i.e. comprises an ultra wide-angle lens (also referred to as a "super wide-angle" or "fisheye" lens). The camera 71 includes an image sensor to receive incident light that is focused through a lens, e.g. the fisheye lens. The camera 71 has a field of view 72 including at least a section of the grid 15. Multiple cameras may be used to observe the entire grid 15, e.g. with each camera 71 having a respective field of view 72 covering a section of the grid 15. The ultra wide-angle lens may be selected for its relatively large field of view 72, e.g. up to a 180-degree solid angle, compared to other lens types, meaning fewer cameras are needed to cover the grid 15. Space may also be limited between the top of the grid 15 and a surrounding structure, e.g. a warehouse roof, thus constraining the height of the camera 71 above the grid 15. An ultra wide-lens camera can provide a relatively large field of view at a relatively low height above the grid 15 compared to other camera types.

The one or more cameras 71 can be used to monitor a workspace of the transport devices 30, the workspace including the grid structure 15. For example, an image feed from the one or more cameras 71 can be displayed on one or more computer monitors remote from the grid 15 to surveil for instances of a faulty, e.g. unresponsive, transport device. An operator may thus detect such an instance and act to resolve the issue, e.g. by resetting the communication link between the transport device and the master controller, or requesting manual intervention for mechanical problems.

An effective monitoring or surveillance system for the workspace incorporates calibration of the one or more ultra wide-angle cameras positioned above the workspace. Accurate calibration of the ultra wide-angle cameras allows for interaction with the images captured thereby, which are distorted by the ultra wide-angle lens, to be mapped correctly to the workspace. Thus, an operator can select areas of pixels in the distorted images which are mapped to corresponding areas of grid spaces in the workspace, for example. In other scenarios, the distorted images from the cameras 71 can be processed to detect faulty transport devices 30 in the workspace and output locations thereof in the workspace and even identification information of the detected transport devices 30 such as unique ID labels. Such examples are described in embodiments below.

Calibration Process

Figure 13:
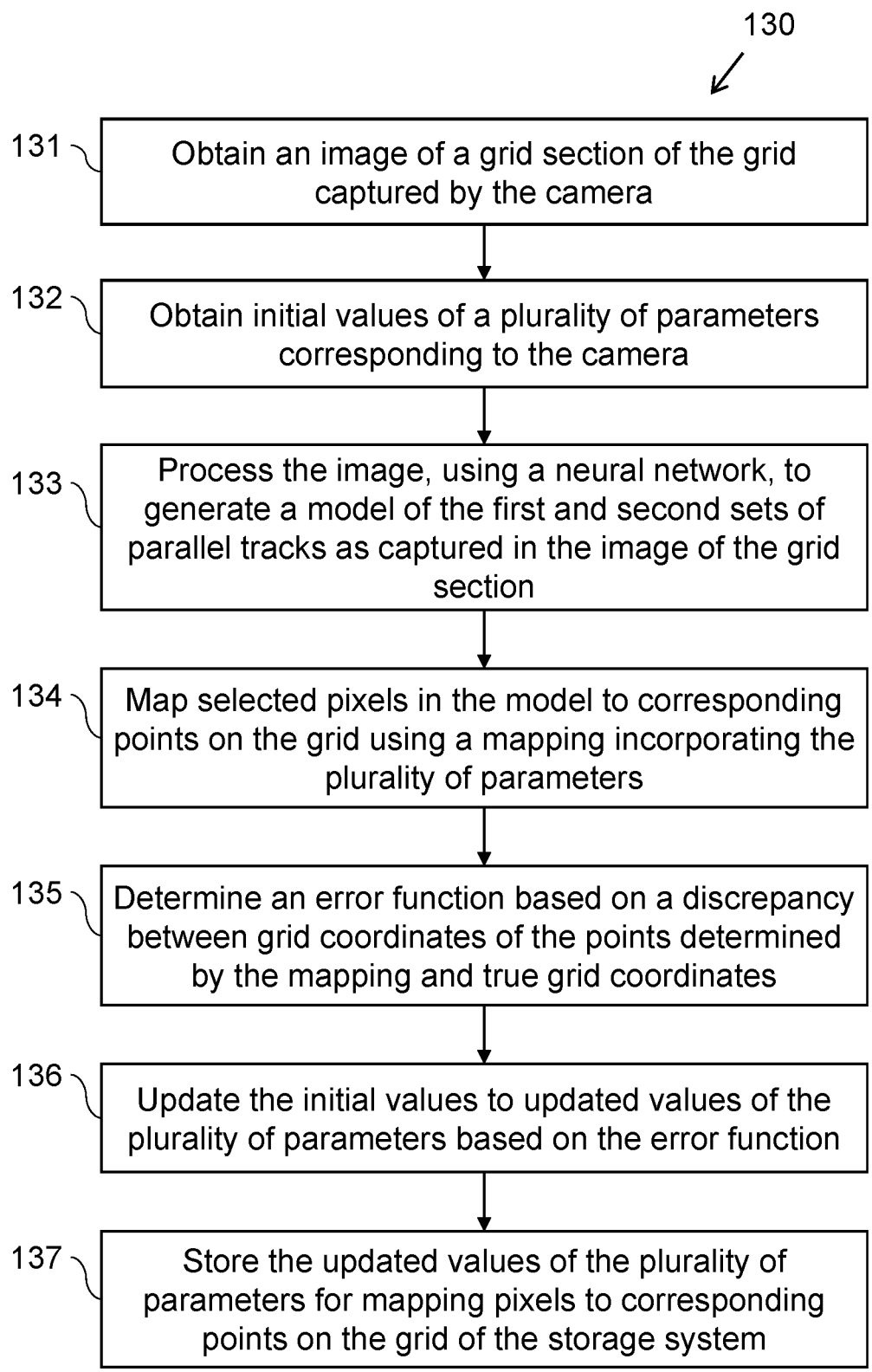
FIG. 13 shows a flowchart depicting a method of calibrating an ultra wide-angle camera disposed above a grid of a storage system according to embodiments.

The calibration process 130 includes, per the example shown in FIG. 13, obtaining 131 an image of a section of the grid 15, i.e. a grid section, captured by the ultra wide-angle camera 71. Obtaining the image includes obtaining, e.g. receiving, image data representative of the image, e.g. at a processor. For example, the image data may be received via an interface, e.g. a camera serial interface (CSI). An image signal processor (ISP) may perform initial processing of the image data, e.g. saturation correction, renormalization, white balance adjustment and/or demosaicing, to prepare the image data for display.

Initial values of a plurality of parameters corresponding to the ultra wide-angle camera 71 are also obtained 132. The parameters include a focal length of the ultra wide-angle camera, a translational vector representative of a position of the ultra wide-angle camera above the grid section, and a rotational vector representative of a tilt and rotation of the ultra wide-angle camera. These parameters are usable in a mapping algorithm for mapping pixels in an image distorted by the ultra wide-angle lens of the camera 71 to a plane oriented with the orthogonal grid 15 of the storage system. The mapping algorithm is described in more detail below.

The calibration process 130 includes processing 133 the image using a neural network trained to detect/predict the tracks in images of grid sections captured by ultra wide-angle cameras.

Neural Network

Figure 9:
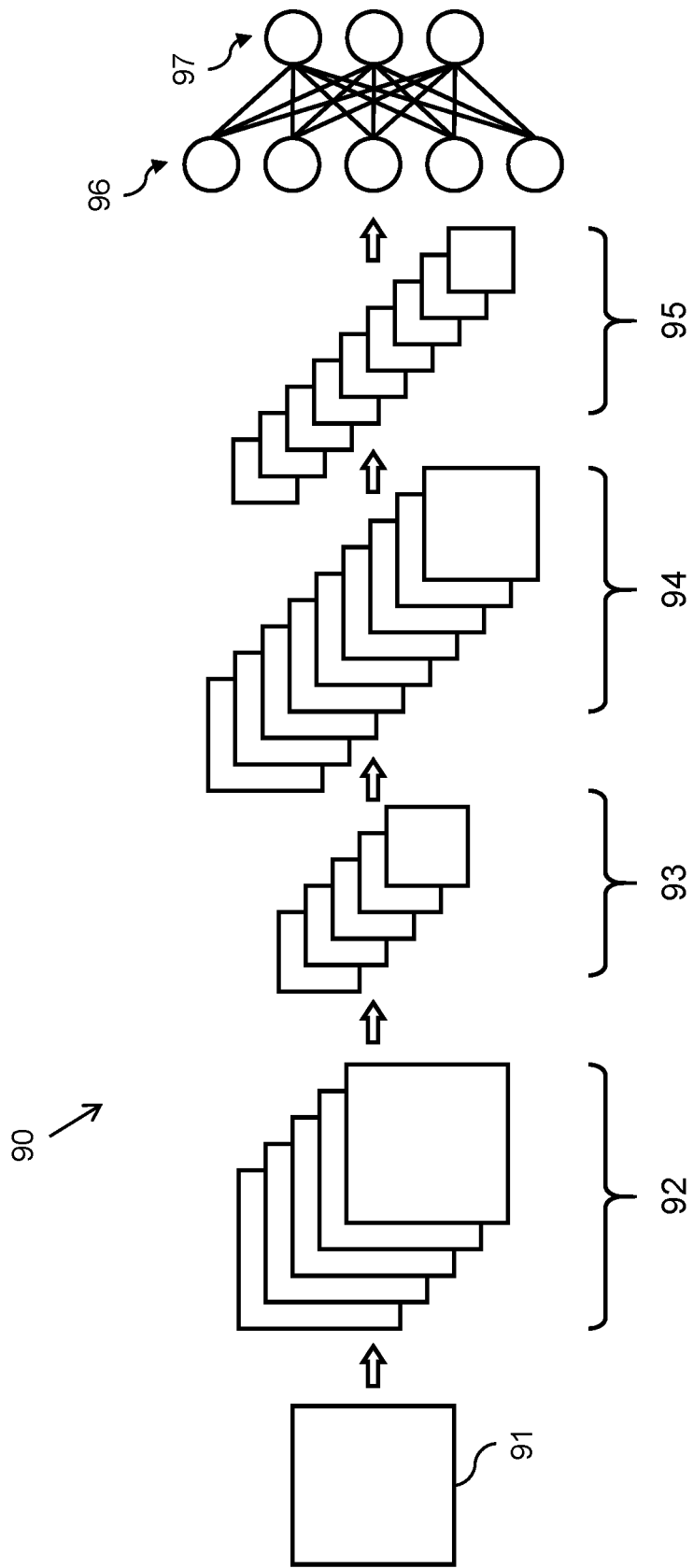
FIG. 9 is a schematic diagram of a neural network according to embodiments.

FIG. 9 shows an example of a neural network architecture. The example neural network 90 is a convolutional neural network (CNN). An example of a CNN is the U-Net architecture developed by the Computer Science Department of the University of Freiburg, although other CNNs are usable e.g. the VGG-16 CNN. An input 91 to the CNN 90 comprises image data in this example. The input image data 91 is a given number of pixels wide and a given number of pixels high and includes one or more colour channels (e.g. red, green and blue colour channels).

Convolutional layers 92, 94 of the CNN 90 typically extract particular features from the input data 91, to create feature maps, and may operate on small portions of an image. Fully connected layers 96 use the feature maps to determine an output 97, e.g. classification data specifying a class of objects predicted to be present in the input image 91.

In the example of FIG. 9, the output of the first convolutional layer 92 undergoes pooling at a pooling layer 93 before being input to the second convolutional layer 94.

Pooling, for example, allows values for a region of an image or a feature map to be aggregated or combined, e.g. by taking the highest value within a region. For example, with 2×2 max pooling, the highest value of the output of the first convolutional layer 92 within a 2×2 pixel patch of the feature map output from the first convolutional layer 92 is used as the input to the second convolutional layer 94, rather than transferring the entire output. Thus, pooling can reduce the amount of computation for subsequent layers of the neural network 90. The effect of pooling is shown schematically in FIG. 9 as a reduction in size of the frames in the relevant layers. Further pooling is performed between the second convolutional layer 94 and the fully connected layer 96 at a second pooling layer 95. It is to be appreciated that the schematic representation of the neural network 90 in FIG. 9 has been greatly simplified for ease of illustration; typical neural networks may be significantly more complex.

In general, neural networks such as the neural network 90 of FIG. 9 may undergo what is referred to as a "training phase", in which the neural network is trained for a particular purpose. A neural network typically includes layers of interconnected artificial neurons forming a directed, weighted graph in which vertices (corresponding to neurons) or edges (corresponding to connections) of the graph are associated with weights, respectively. The weights may be adjusted throughout training, altering the output of individual neurons and hence of the neural network as a whole. In a CNN, a fully connected layer 96 typically connects every neuron in one layer to every neuron in another layer, and may therefore be used to identify overall characteristics of an image, such as whether the image includes an object of a particular class, or a particular instance belonging to the particular class.

In the present context, the neural network 90 is trained to perform object identification by processing image data, e.g. to determine whether an object of a predetermined class of objects is present in the image (although in other examples the neural network 90 may have been trained to identify other image characteristics of the image instead). Training the neural network 90 in this way for example generates weight data representative of weights to be applied to image data (for example with different weights being associated with different respective layers of a multi-layer neural network architecture). Each of these weights is multiplied by a corresponding pixel value of an image patch, for example, to convolve a kernel of weights with the image patch.

Specific to the context of ultra wide-angle camera calibration, the neural network 90 is trained with a training set of input images of grid sections captured by ultra wide-angle cameras to detect the tracks 22 of the grid 15 in a given image of a grid section. In examples, the training set includes mask images, showing the extracted track features only, corresponding to the input images. For example, the mask images are manually produced. The mask images can thus act as a desired result for the neural network 90 to train with using the training set of images. Once trained, the neural network 90 can be used to detect the tracks 22 in images of at least part of the grid structure 15 captured by an ultra wide-angle camera.

The calibration process 130 includes processing 133 the image of the grid section captured by the ultra wide-angle camera 71 with the trained neural network 90 to detect the tracks 22 in the image. At least one processor (e.g. a neural network accelerator) may be used to do the processing 133. The image processing 133 generates a model of the tracks, specifically the first and second sets of parallel tracks, as captured in the image of the grid section. For example, the model comprises a representation of a prediction of the tracks in the distorted image of the grid section as determined by the neural network 90. The model of the tracks corresponds to a mask or probability map in examples.

Selected pixels in the determined track model are then mapped 134 to corresponding points on the grid 15 using a mapping, e.g. a mapping algorithm, which incorporates the plurality of parameters corresponding to the ultra wide-angle camera. The obtained initial values are used as inputs to the mapping algorithm.

An error function (or "loss function") is determined 135 based on a discrepancy between the mapped grid coordinates and "true", e.g. known, grid coordinates of the points corresponding to the selected pixels. For example, a selected pixel located at the centre of an X-direction track 22a should correspond to a grid coordinate with a half-integer value in the Y-direction, e.g. (x, y.5) where the x is an unknown number and y is an unknown integer. Similarly, a selected pixel located at the centre of an Y-direction track 22b should correspond to a grid coordinate with a half-integer value in the X-direction, e.g. (x'0.5, y') where x' is an unknown integer and y' is an unknown number. In examples, the width and length of the grid cells (or a ratio thereof) is used in the loss function, e.g. to calculate the cell x, y coordinate for key points and check whether they are on a track (e.g. a coordinate value of n.5 where n is an integer).

The initial values of the plurality of parameters corresponding to the ultra wide-angle camera are then updated 136 to updated values based on the determined error function. For example, a Broyden-Fletcher-Goldfarb-Shanno (BFGS) algorithm is applied using the error function and initial parameter values as inputs. In examples, the updated values of the plurality of parameters are iteratively determined, with the error function being recalculated with each update. The iterations may continue until the error function is reduced by less than a predetermined threshold, e.g. between successive iterations or compared to the initial error function, or until an absolute value of the error function falls below a predetermined threshold. Other iterative algorithms, e.g. sequential quadratic programming (SQP) or sequential least-squares quadratic programming (SLSQP), can be used with the initial values to generate a sequence of improving approximate solutions for the plurality of parameters, in which a given approximation in the sequence is derived from the previous ones. In certain cases, the iterative algorithm is used to optimise the values of the plurality of parameters. For example, the updated values are optimised values of the plurality of parameters.

The updating 136 of the initial values of the plurality of parameters corresponding to the ultra wide-angle camera involves applying one or more respective boundary values for the plurality of parameters. For example, the boundary values for a rotation angle associated with the rotation vector are substantially 0 degrees and substantially +5 degrees. Additionally or alternatively, the boundary values for a planar component of the translational vector are ±0.6 of a length of a grid cell. Additionally or alternatively, the boundary values for a height component of the translational vector are 1800 mm and 2100 mm, or 1950 mm and 2550 mm, or 2000 mm and 2550 mm above the grid. For example, a lower bound for the camera height is in the range 1800 to 2000 mm. For example, an upper bound for the camera height is in the range 2100 to 2600 mm. Additionally or alternatively, the boundary values for the focal length of the camera are 0.23 and 0.26 cm. Applying the one or more respective boundary values for the plurality of parameters can mean that the updating, e.g. optimisation, process is performed in a feasible region or solution space, i.e. a set of all possible values which satisfy the one or more boundary conditions.

The updated values of the plurality of parameters are electronically stored 137 for future mapping of pixels in grid section images captured by the ultra wide-angle camera 71 to corresponding points on the grid 15 via the mapping algorithm. For example, the stored values of the plurality of parameters are retrieved from data storage and used in the mapping algorithm to compute the grid coordinates corresponding to a given pixel in a given image of the grid section captured by the ultra wide-angle camera 71. In examples, the updated values are stored at a storage location, e.g. in a database, associated with the ultra wide-angle camera 71. For example, a lookup function or table may be used with the database to find the stored parameter values associated with any given ultra wide-angle camera employed in the storage system 1 above the grid 15.

Figure 11:
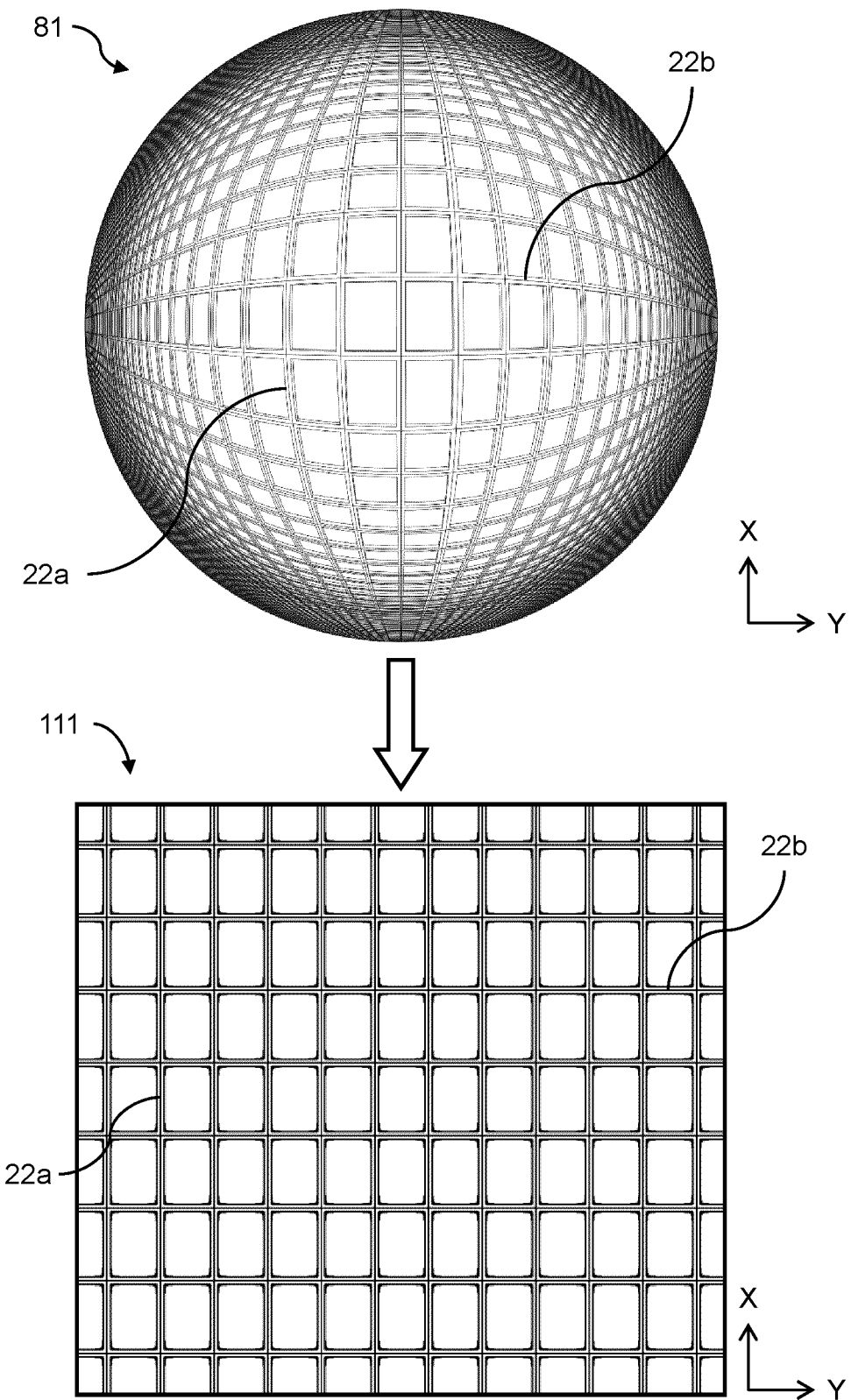
FIG. 11 is a schematic diagram showing a flattening of a captured image of the grid framework structure according to embodiments.

Following calibration of a given camera 71 disposed above the grid 15, an image (e.g. "snapshot") of a grid section captured by the camera 71 can be flattened, i.e. undistorted, for interaction by an operator. For example, using the image-to-grid mapping function as described, the distorted image 81 of the grid section can be converted into a flattened image 111 of the grid section, as shown in the example of FIG. 11. The flattening involves selecting an area of grid cells to flatten in the distorted image 81, and inputting grid coordinates corresponding to those cells into the mapping function which determines which respective pixel values from the distorted image 81 should be copied into the flattened image 111 for the respective grid coordinates. A target resolution, e.g. in pixels per grid cell, can be set for the flattened image 111, which may have a ratio corresponding to the ratio of the grid cell dimensions. Once all the pixel values needed in the flattened image (per the target resolution and selected number of grid cells) are determined, the flattened image 111 can be generated.

The snapshots may be captured by the camera 71 at predetermined intervals, e.g. every ten seconds, and converted into corresponding flattened images 111. The most recent flattened image 111 is stored in storage for viewing on a display, for example, by an operator wishing to view the grid section covered by the camera 71. The operator may instead choose to retake a snapshot of the grid shot and have it flattened. The operator can thus select regions, e.g. pixels, in the flattened image 111 and have those selected regions converted to grid coordinates based on the image-to-grid mapping function as described herein. In some cases, the flattened image 111 includes annotations of the grid coordinates for the grid spaces viewable in the flattened image 111. The flattened images 111 corresponding to each camera 71 may be more user-friendly for monitoring the grid 15 compared to the distorted images 81, 82.

Grid to Image Mapping

Mapping real-world points on the grid 15 to pixels in an image captured by a camera is done by a computational algorithm. The grid point is first projected onto a plane corresponding to the ultra wide-angle camera 71. For example, at least one of a rotation using the rotation matrix and a planar translation in the X- and Y-directions is applied to the point having x, y, and z coordinates in the grid framework structure 14. The focal length f of the ultra wide-angle camera may be used to project the point with three-dimensional coordinates relative to the grid 15 onto a two-dimensional plane relative to the ultra wide-angle camera 71. For example, the coordinates of the mapped point q in the plane of the ultra wide-angle camera 71 are calculated as $q = f \cdot p_{[x,y]} \div p_z$, where $p_{[x,y]}$ and $p_z$ are the planar x-y coordinates and third z coordinate of the point p relative to the grid 15, respectively.

Figure 8A:
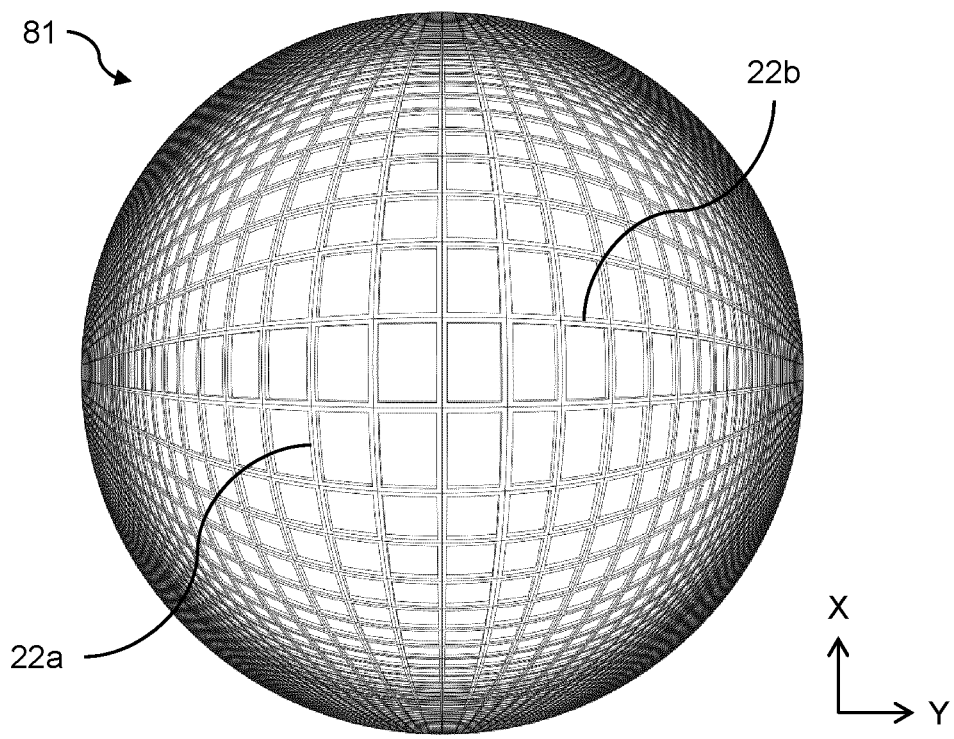
FIGS. 8A and 8B are schematic representations of images captured by the camera positioned above the grid framework structure according to embodiments.
Figure 8B:
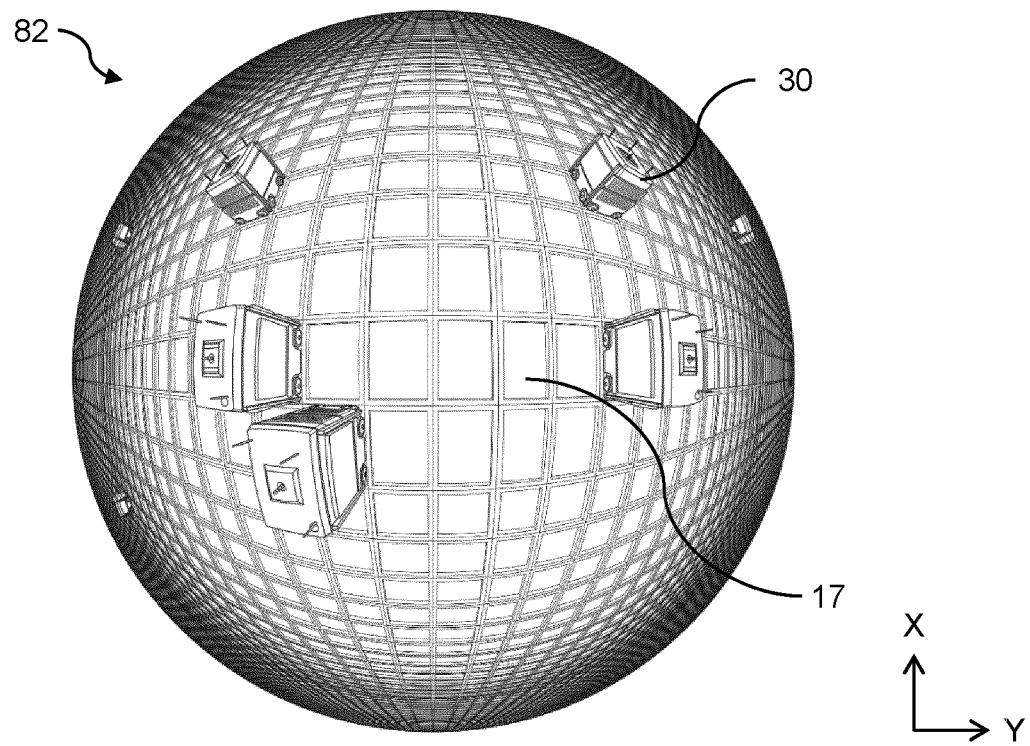

The point q projected onto the ultra wide-angle camera plane may be aligned with a cartesian coordinate system in the plane to determine first cartesian coordinates of the point. For example, aligning the point with the cartesian coordinate system involves rotating the point, or a position vector of the point in the plane (e.g. a vector from the origin to the point). The rotation is thus to align with the typical grid orientation in the images captured by the camera, for example, but may not be necessary if the X- and Y-directions of the grid are already aligned with the captured images. The rotation is substantially 90 degrees in examples. As shown in FIGS. 8A and 8B, the X- and Y-directions of the grid are offset by 90 degrees with respect to the horizontal and vertical axes of the image; thus the rotation "corrects" this offset such that the X- and Y-directions of the grid align with the horizontal and vertical axes of the captured images.

The grid-to-image mapping algorithm continues with converting the first cartesian coordinates into first polar coordinates using standard trigonometric methods. A distortion model is then applied to the first polar coordinates of the point to generate second, e.g. "distorted", polar coordinates. In examples, the distortion model comprises a tangent model of distortion given by $r' = f \cdot \arctan(r/f)$, where r and r' are the undistorted and distorted radial coordinates of the point, respectively, and f is the focal length of the ultra wide-angle camera.

The second polar coordinates are then converted back into (second) cartesian coordinates using the same standard trigonometric methods in reverse. The image coordinates of the pixel in the image are then determined based on the second cartesian coordinates. In examples, this determination includes at least one of de-centering or re-scaling the second cartesian coordinates. Additionally or alternatively, the ordinate (y-coordinate) of the second cartesian coordinates is inverted, e.g. mirrored in the x-axis.

Image to Grid Mapping

Mapping pixels in an image captured by the camera 71 to real-world points on the grid 15 is done by a different computational algorithm. For example, the image-to-grid mapping algorithm is an inverse of the grid-to-image mapping algorithm described above, with each mathematical operation being inverted.

For a given pixel in the image, (second) cartesian coordinates of the mapped point are determined based on image coordinates of the pixel in the image. For example, this determination involves initialising the pixel in the image, e.g. including at least one of centering or normalising the image coordinates. As before, the ordinate is inverted in some examples.

The second cartesian coordinates are converted into second polar coordinates using the mentioned standard trigonometric methods. The use of the label "second" is used for consistency with the conversions done in the described grid-to-image algorithm, but is arbitrary.

An inverse distortion model is applied to the second polar coordinates to generate first, e.g. "undistorted", polar coordinates. In examples, the inverse distortion model is based on a tangent model of distortion given by $r = f \cdot \tan(r'/f)$, where again r' is the distorted radial coordinate of the point, r is the undistorted radial coordinate of the point, and f is the focal length of the ultra wide-angle camera. Thus, in examples, the inverse distortion model used in the image-to-grid mapping is an inverse function, or "anti-function", of the distortion model used in the grid-to-image mapping.

The image-to-grid mapping algorithm continues with converting the first polar coordinates into first cartesian coordinates. The first cartesian coordinates may be de-aligned, or unaligned, with a cartesian coordinate system in the plane corresponding to the ultra wide-angle camera. For example, de-aligning the point with the cartesian coordinate system involves applying a rotational transformation to the point, or a position vector of the point in the plane (e.g. a vector from the origin to the point). The rotation is substantially 90 degrees in examples. This rotation may thus "undo" any "correction" to an offset between the X- and Y-directions of the grid and the horizontal and vertical axes of the captured images previously described in the grid-to-image mapping.

Finally, the point is projected from the (second) plane corresponding to the camera 71 onto the (first) plane corresponding to the grid 15 to determine grid coordinates of the point relative to the grid.

In examples, projecting the point onto the plane corresponding to the grid 15 involves computing $p=B^{-1} \cdot (f \cdot t - q \cdot z)$, where $B = q \cdot R_{3,[1,2]} - f \cdot R_{[1,2],[1,2]}$. In these equations, p comprises point coordinates in the grid plane, q comprises cartesian coordinates in the camera plane, and f is the focal length of the ultra wide-angle camera as before. Furthermore, t is a planar translation vector, z is a distance (e.g. height) between the ultra wide-angle camera and the grid, and R is a three-dimensional rotation matrix related to a rotation vector. The rotation vector comprises a direction representing the rotation axis of the rotation and a magnitude representing the angle of rotation. The rotation matrix R corresponding to the angle-axis rotation vector can be determined from the vector, e.g. using Rodrigues' rotation formula.

A mathematical derivation of the function for projecting the undistorted 2D point q from the camera plane is now provided for completeness. Beginning with the grid to image projection from above: $q = f \cdot p'_{[x,y]} = p'_z$, where p' is the rotated and translated grid point p, i.e. $p' = R \cdot p + (t_x, t_y, z)^T$, we are aiming to derive p from q. Rearranging and substituting for p' gives:

$$p'_z \cdot q = f \cdot p'_{[x,y]}$$

$$\Leftrightarrow (R \cdot p + (t_x, t_y, z)^T)_z \cdot q = f \cdot (R \cdot p + (t_x, t_y, z)^T)_{[x,y]}$$

$$\Leftrightarrow ((R \cdot p)_z + z) \cdot q = f \cdot ((R \cdot p)_{[x,y]} + t)$$

$$\Leftrightarrow (R \cdot p)_z \cdot q + z \cdot q = f \cdot (R \cdot p)_{[x,y]} + f \cdot t$$

$$\Leftrightarrow (R \cdot p)_z \cdot q - f \cdot (R \cdot p)_{[x,y]} = f \cdot t - z \cdot q$$

Since the desired distance of the point p on the grid from the camera is given by the height parameter z, it can be assumed in the translation of the point that $p_z = 0$. Thus, all $p_z$ terms can be removed to leave:

$$(R_{3,[1,2]} \cdot P_{[x,y]}) \cdot q - f \cdot R_{[1,2],[1,2]} \cdot p_{[x,y]} = f \cdot t - z \cdot q$$

$$\Leftrightarrow (q \cdot R_{3[1,2]} - f \cdot R) \cdot p_{[x,y]} = f \cdot t - z \cdot q$$

By defining a matrix $B=(q \cdot R_{3,[1,2]} - f \cdot R)$, the expression can be further simplified to $B \cdot p_{[x,y]} = f \cdot t - z \cdot q$, which resolves as the equation above for computing the point p by using the inverse matrix $B^{-1}$.

Returning to the calibration process 130, in some cases grid cell coordinate data encoded in grid cell markers positioned about the grid 15 can be used to calibrate the computed grid coordinates corresponding to a pixel in a captured image. For example, the grid cell markers are signboards, e.g. placed in predetermined grid cells 17, with corresponding cell coordinate data marked on each signboard. The process 130 includes, for example, processing the captured image to detect a grid cell marker in the image and then extracting the grid cell coordinate data encoded in the grid cell marker to use in calibrating the mapped grid coordinates. Each grid cell marker is located in a respective grid cell, for example located below a respective camera 71 in the field of view 72 thereof.

The image processing may involve using an object detection model, e.g. a neural network, trained to detect instances of grid cell markers in images of grid sections. A computer vision platform, e.g. the Cloud Vision API (Application Programming Interface) by Google®, may be used to implement the object detection model. The object detection model may be trained with images of grid sections including grid cell markers. In examples where the object detection model includes a neural network, e.g. a CNN, the description with reference to FIG. 9 applies accordingly.

The grid coordinates-generated by the mapping of pixels in the captured image to points on the grid section represented in the image—can be calibrated to the entire grid based on the extracted cell coordinate data. For example, the mapped grid point corresponding to a given pixel comprises coordinates in units of grid cells, e.g. (x, y) with a number x of grid cells in the X-direction and a number y of grid cells in the Y-direction. However, the grid cells captured by the camera 71 are of a grid section, i.e. a section of the grid 15, and thus not necessarily the entire grid 15. Thus the mapped grid coordinates (x, y) relative to the grid section captured in the image may be calibrated to grid coordinates (x', y') relative to the entire grid based on the relative location of the grid section with respect to the entire grid. The location of the grid section relative to the entire grid can be determined by extracting the grid cell coordinate data encoded in a grid cell marker captured in the image, as described.

Figure 10A:
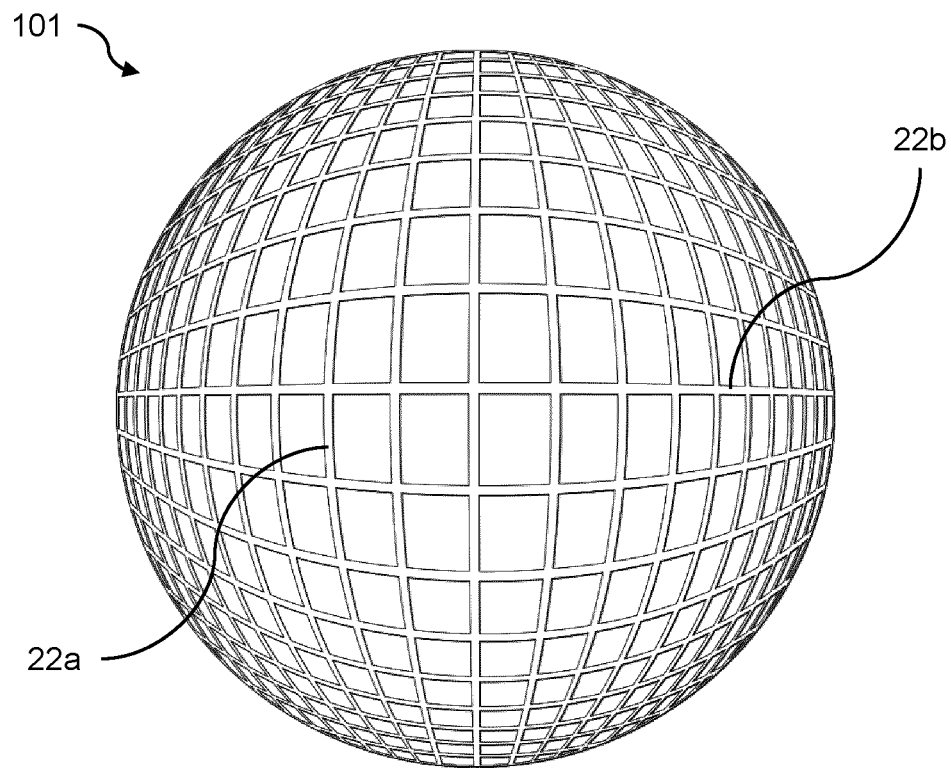
FIGS. 10A and 10B are schematic diagrams of a generated model of the tracks of the grid framework structure according to embodiments.

FIG. 10A shows an example model 101 of the tracks generated by processing an image 81 of a grid section, as captured by the ultra wide-angle camera 71, with the trained neural network 90 to detect the tracks 22 in the image. The model 101 comprises a representation of a prediction of the tracks 22a, 22b in the distorted image of the grid section as determined by the neural network 90. Mapping pixels from the track model 101 to corresponding points on the grid 15 can be done to calibrate the camera 71 as described. For example, the calibration involves updating, e.g. optimising, the plurality of parameters associated with the camera 71 that are used for mapping between pixels in the captured images 81, 82 and points on the grid 15.

In examples, the model 101 of the grid section can be refined to represent only centrelines of the first 22a and second 22b sets of parallel tracks. Thus, the pixels to be mapped from the track model 101 to corresponding points on the grid 15 are, for example, pixels lying on a centreline of the first 22a or second 22b sets of parallel tracks in the generated model 101. The refining involves, for example, filtering the model with horizontal and vertical line detection kernels. The kernels allow the centrelines of the tracks to be identified in the model 101, e.g. in the same way other kernels can be used to identify other features of an image such as edges in edge detection. Each kernel is a given size, e.g. a 3×3 matrix, which can be convolved with the image data in the model 101 with a given stride. For example, the horizontal line detection kernel is representable as the matrix:

$$\begin{bmatrix} 0 & 0 & 0 \\ 1 & 1 & 1 \\ 0 & 0 & 0 \end{bmatrix}.$$

Similarly, the vertical line detection kernel is representable, for example, as the matrix:

$$\begin{bmatrix} 0 & 1 & 0 \\ 0 & 1 & 0 \\ 0 & 1 & 0 \end{bmatrix}.$$

In examples, the filtering involves at least one of eroding and dilating pixel values of the model 101 using the horizontal and vertical line detection kernels. For example, at least one of an erosion function and a dilation function is applied to the model 101 using the kernels. The erosion function effectively "erodes" away the boundaries of a foreground object, in this case the tracks 22*a*, 22*b* in the generated model 101, by convolving the kernel with the model. During erosion, pixel values in the original model (either '1' or '0') are updated to a value of '1' only if all the pixels convolved under the kernel are equal to '1', otherwise it is eroded (updated to a value of '0'). Effectively all the pixels near the boundary of the tracks 22*a*, 22*b* in the model 101 will be discarded, depending upon the size of kernel used in the erosion, such that the thickness of each of the tracks 22*a*, 22*b* decreases to substantially the centreline thereof. The dilation function is the opposite of the erosion function and can be applied after erosion to effectively "dilate" or widen the centreline remaining after the erosion. This dilation can stabilise the centrelines of the tracks 22*a*, 22*b* in the refined model 101. During dilation, pixel values are updated to a value of '1' if at least one pixel convolved under the kernel is equal to '1'. The erosion and dilation functions are applied respectively to the original generated model 101, for example, with the resulting horizontal centreline and vertical centreline "skeletons" being combined to produce the refined model.

In some cases, the generated model 101 may have missing sections of the tracks 22*a*, 22*b*, for example where one or more regions of the grid section viewable by the camera 71 are obscured. Objects on the grid 15 such as transport devices 30, pillars or other structures may obscure parts of the track in the captured image. Thus, the generated model 101 can have the same missing regions of track. Similarly, false positive predictions of the tracks may be present in the generated model 101.

Figure 10B:
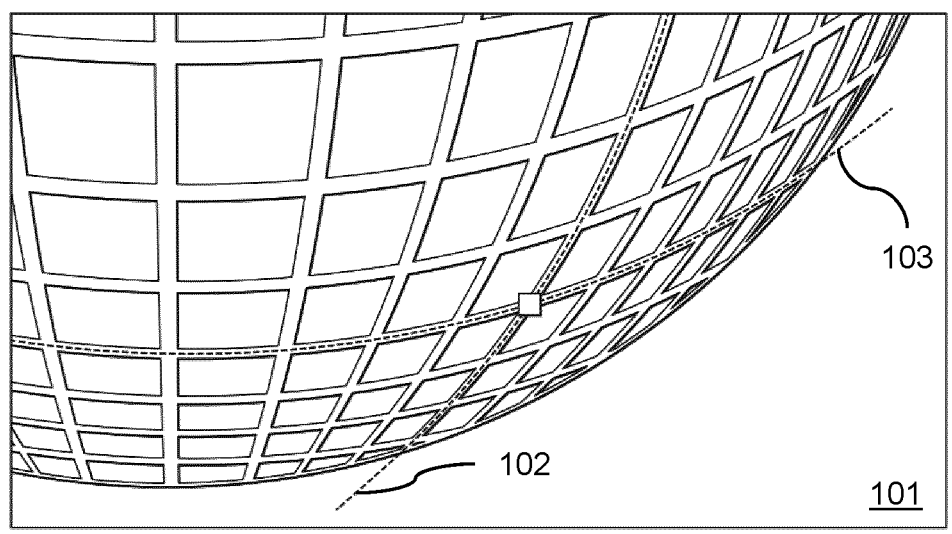

To help with these problems, the tracks 22*a*, 22*b* present in the generated model (e.g. the centrelines thereof) can be fitted to respective quadratic equations, e.g. to produce quadratic trajectories for the tracks 22*a*, 22*b*. FIG. 10B shows an example of a track of the first set of tracks 22*a* in the model 101 being fitted to a first quadratic trajectory 102 and a track of the second set of tracks 22*b* in the model 101 being fitted to a second quadratic trajectory 103. Quadratic track centrelines can then be produced based on the quadratic trajectories, e.g. by extrapolating pixel values along the quadratic trajectories to fill in any gaps or remove any false positives in the model 101. For example, if a sub-line generated from a predicted grid model 101 cannot be fitted to a given quadratic curve together with at least one other line, then it is very unlikely to be part of the grid and should be excluded.

The quadratic equations, $y=ax^2+bx+c$, used for fitting the tracks in the model 101 may also have specified boundary conditions, for example:

$$500 < \frac{-b}{2a} < 2500; -9.9 \times 10^{-4} < a < 9.9 \times 10^{-4}; -5 < b < 5; \text{and } 0 < c < 3200.$$

In examples, a predetermined number of pixels are extracted from the refined model 101 of the tracks, e.g. to reduce the storage requirements to store the model. For example, a random subset of pixels are extracted to give the final refined model 101 of the tracks.

Calibrating the ultra wide-angle cameras 71 using the systems and methods described herein allows for images captured by the cameras 71 with a wide field of view of the grid 15 to be used to detect and localise transport devices thereon, for example. This is despite the relatively high distortion present in the images compared to those of other camera types.

The automatic calibration process outlined above can also reduce the time taken to calibrate each camera 71 installed above the grid 15 of the storage system compared to manual methods of tuning the parameters associated with the respective cameras 71. For example, combining the neural network model, e.g. U-Net, with the customised optimisation function to implement the calibration pipeline as described can remove more than 80% of errors compared to standard calibration methods. Furthermore, the calibration systems and methods described herein have proved to be versatile and consistent enough to calibrate the cameras in multiple warehouse storage systems, e.g. with differing dimensions, scale, and layout.

Furthermore, the output flattened calibrated image 111 of the grid allows for easier interaction with the image 111, both by humans and machines, for monitoring the grid 15 and the transport devices 30 moving thereon. It can therefore be more efficient for instances of unresponsiveness of a given transport device on the grid to be detected and/or acted on to resolve operation of the fleet of transport devices 30.

Detecting a Transport Device in a Workspace

Provided herein are methods and systems for processing distorted images 82 captured by the cameras 71 to detect transport devices 30 on the grid. For example, locations of the detected transport devices 30 relative to the grid 15 can be outputted. In some examples, identification information of the detected transport devices 30, e.g. unique ID labels, can be outputted. Such examples will now be described in more detail.

Figure 14:
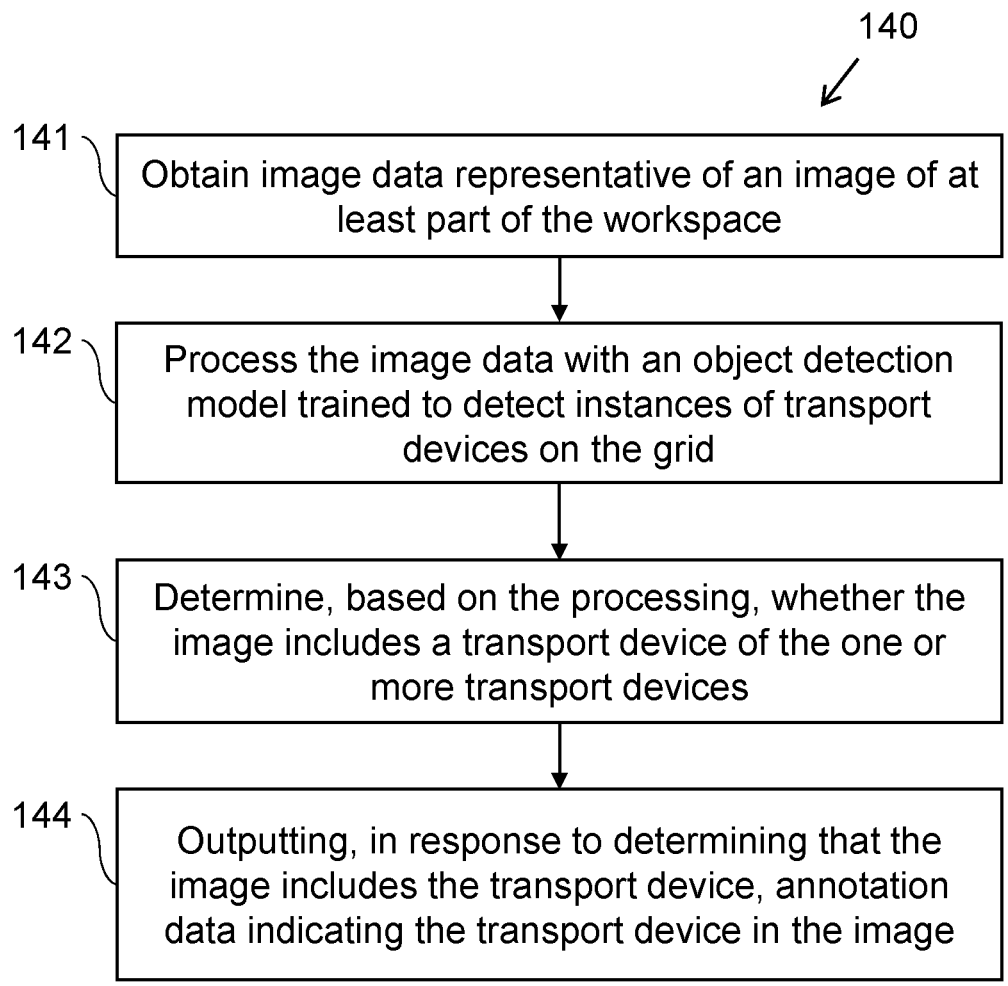
FIG. 14 shows a flowchart depicting a method of detecting a transport device in a workspace comprising a grid according to embodiments.

FIG. 14 shows a computer-implemented method 140 of detecting a transport device 30 in the workspace comprising the grid 15. The method 140 involves obtaining 141 and processing 142 image data, representative of an image of at least part of the workspace, with an object detection model trained to detect instances of transport devices on the grid. For example, the image is captured by a camera 71 with a field of view covering at least part of the workspace and the image data is transferred to the computer for implementing the detection method 140. The image data is received at an interface, e.g. a CSI, of the computer, for example.

The object detection model may be a neural network, e.g. a convolutional neural network, trained to perform object detection of transport devices 30 on the grid 15 of the workspace. The description of neural networks with respect to FIG. 9 therefore applies in these specific examples. In the present context, the object detection model, e.g. CNN 90, is trained to perform object identification by processing the obtained image data to determine whether an object of a predetermined class of objects (i.e. a transport device) is present in the image. Training the neural network 90, for example, involves providing training images of workspace sections with transport devices present to the neural network 90. Weight data is generated for the respective (convolutional) layers 92, 94 of a multi-layer neural network architecture and stored for use in implementing the trained neural network. In examples, the object detection model comprises a "You Only Look Once" (YOLO) object detection model, e.g. YOLOv4 or Scaled-YOLOv4, which has a CNN-based architecture. Other example object detection models include neural-based approaches such as RetinatNet or R-CNN (Regions with CNN features) and non-neural approaches such as a support vector machine (SVM) to do the object classification based on determined features, e.g. Haar-like features or histogram of oriented gradients (HOG) features.

The method 140 involves determining 143, based on the processing 142, whether the image includes a transport device 30. For example, the object detection model is configured, e.g. trained or learnt, to detect whether a transport device 30 is present in a captured image of the workspace. In examples, the object detection model makes the determination 143 with a level of confidence, e.g. a probability score, corresponding to a likelihood that the image includes a transport device 30. A positive determination may thus correspond to a confidence level above a predetermined threshold, e.g. 90% or 95%. In response to determining 143 that the image includes the transport device, annotation data (e.g. prediction data or inference data) indicating the predicted transport device in the image is output 144. An updated version of the image including the annotation data may be output as part of the method 140, for example.

Figure 12:
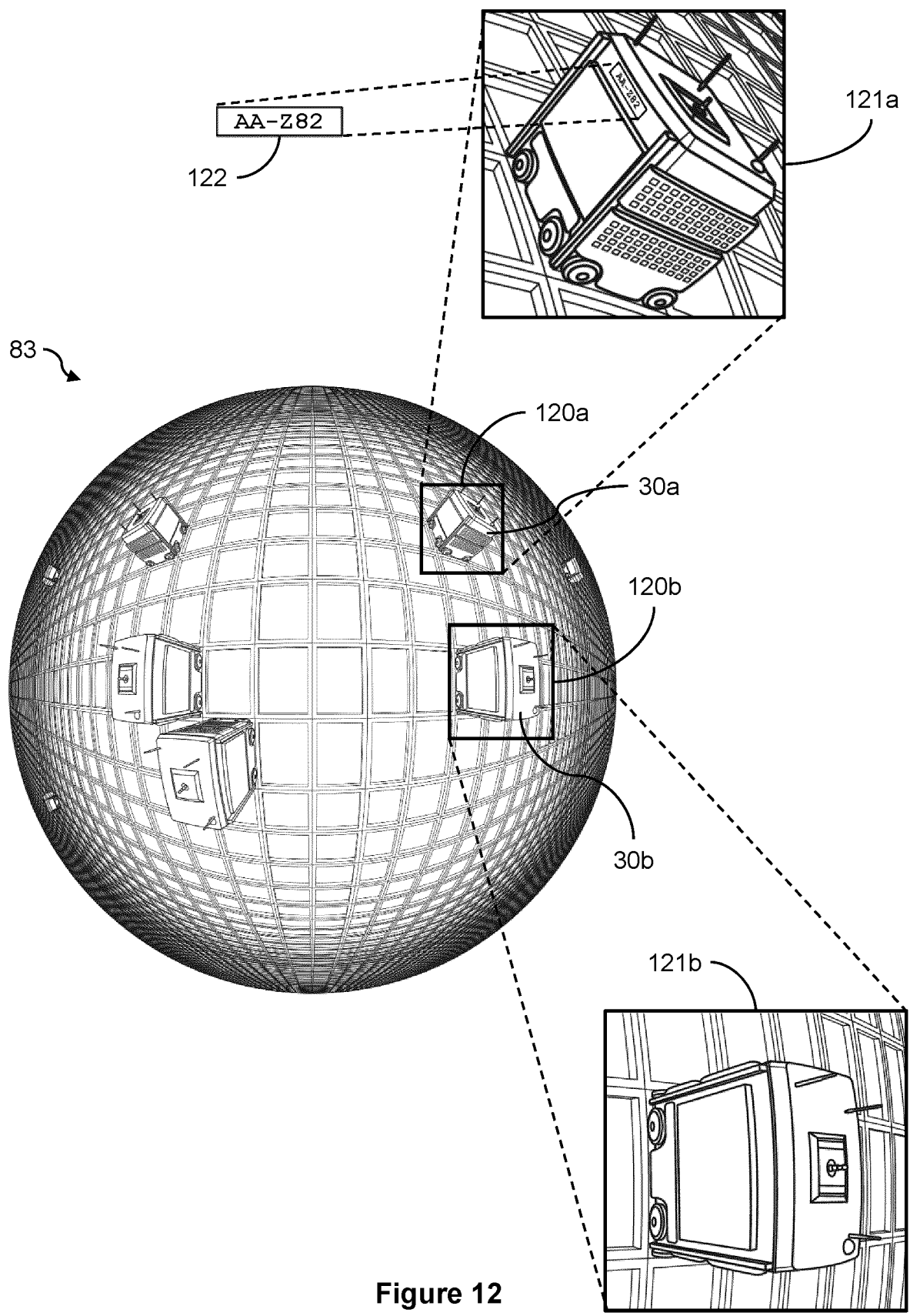
FIG. 12 is a schematic diagram showing modifications of a captured image of the grid framework structure according to embodiments.

In examples, the annotation data comprises a bounding box. FIG. 12 shows an example of an updated version 83 of the image 82 captured by the ultra wide-angle camera 71 annotated with bounding boxes 120a, 120b. The bounding boxes 120a, 120b correspond, respectively, to a first transport device 30a and a second transport device 30b detected by the object detection model. A given bounding box comprises a rectangle that surrounds the detected object, for example, and may specify one or more of a position, identified class (e.g. transport device) and a confidence score (e.g. how likely the object is to be present within the box). Bounding box data defining the given bounding box may include coordinates of two corners of the box or a centre coordinate with width and height parameters for the box. In examples, the detection method 140 involves generating the annotation data 120a, 120b for outputting.

In some cases, the object detection model is further trained to detect instances of faulty transport devices in the workspace, e.g. transport devices unresponsive to communications from the master controller and/or misaligned with the grid and/or with a warning signal engaged.

For example, the method 140 involves processing the image data with the object detection model to determine, based on the processing, whether the image includes a transport device misaligned with the grid. The object detection model may be the same one used to detect the transport devices or a different one. The object detection model is trained with a training set of images of transport devices misaligned with the grid 15, e.g. at an angle offset from the orthogonal tracks 22, for example. In response to determining that the image includes the misaligned transport device, the method may include outputting at least one of annotation data or an alert. The annotation data indicates the predicted misaligned transport device in the image, for example. As before, the annotation may comprise a bounding box surrounding the predicted misaligned transport device on the grid. The outputted alert signals that the image includes the misaligned transport device, for example.

Similarly, the method 140 may involve processing the image data with the object detection model to determine, based on the processing, whether the image includes a transport device with a warning signal engaged. The warning signal of the transport device comprises a predetermined light, or colour of light, emitted by a light source on the transport device-such as a light emitting diode (LED). For example, the transport devices include an LED which is configured to emit a first wavelength (colour) of light when responsive to communications from the master controller and emit a second, different, colour wavelength (colour) of light when unresponsive to communications from the master controller. The transport device may be in an unresponsive state when communication with the master controller is lost, for example, thus causing the warning signal to be engaged. Other types of warning signal from the light source are possible, for example a predetermined pattern of emission such as flashing. In response to determining that the image includes the misaligned transport device, the method 140 may include outputting at least one of annotation data or an alert. The annotation data indicates the predicted transport device with the warning signal engaged in the image. For example, the annotation data comprises a bounding box surrounding the predicted transport device with the warning signal engaged in the image. Similarly, the outputted alert signals that the image includes the transport device with the warning signal engaged. Examples of an outputted alert include a text or other visual message to be displayed, e.g. on a screen for viewing by an operator.

Localisation of Transport Devices

The method 140 of detecting a transport device 30 in the workspace can include generating further annotation data corresponding to a plurality of virtual transport devices at multiple respective grid spaces 17 in the image 82. The location of the detected transport device 30 on the grid 15 can then be determined by comparing the annotation data indicating the detected transport device in the image with the further annotation data corresponding to the plurality of virtual transporting devices. For example, the comparison includes calculating intersection over union (IoU) values using the annotation data. The grid space corresponding to the further annotation data associated with the highest IoU value may then be selected as the grid location of the detected transport device.

In examples, the further annotation data comprises a plurality of bounding boxes corresponding to the plurality of virtual transport devices. Calculating the IoU values may thus involve dividing an area of overlap, or "intersection", between two bounding boxes by an area of union of the two bounding boxes (e.g. a total area covered by the two boxes). For example, the area overlap between the bounding box of the detected transport device and a given bounding box corresponding to a given virtual transport device is computed and divided by the area of union for the same two bounding boxes. This calculation is repeated for the bounding box of the detected transport device and each bounding box corresponding to a respective virtual transporting device to give a set of IoU values. The highest IoU value in the set of IoU values may then be selected and the grid location of the corresponding bounding box is inferred as the grid location of the detected transport device.

A detection system may be configured to perform any of the detection methods described herein. For example, the detection system includes an image sensor to capture the images of at least part of the workspace and an interface to obtain the image data. The detection system includes the trained object detection model, e.g. implemented on a graphics processing unit (GPU) or a specialised neural processing unit (NPU), to carry out the processing and determining steps of the computer-implemented method 140 of detecting a transport device 30.

Detecting an Identification Marker on a Transport Device

Figure 15:
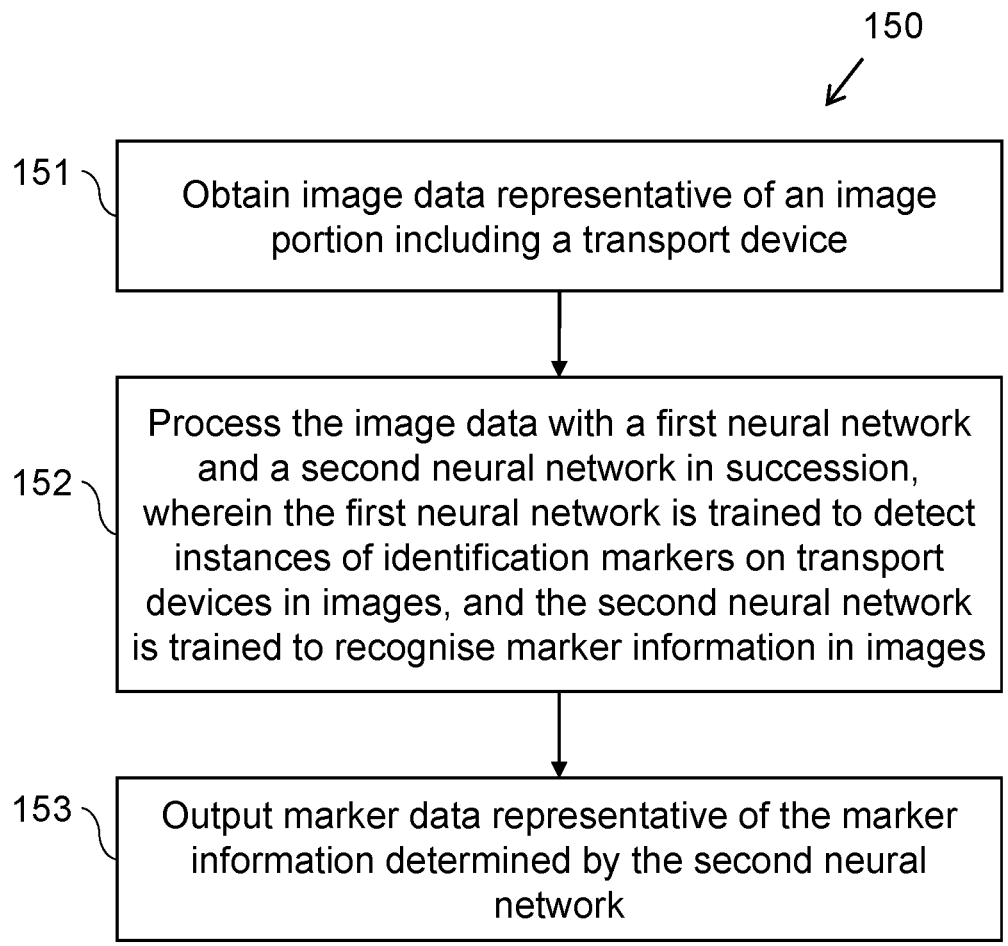
FIG. 15 shows a flowchart depicting a method of detecting an identification marker on a transport device in a workspace comprising a grid according to embodiments.

FIG. 15 shows a computer-implemented method 150 of detecting an identification marker on a transport device in the workspace comprising the grid 15. The method involves obtaining 151 image data representative of an image portion including the transport device. The image portion may be a portion, e.g. at least part of, of an image 82, e.g. shown in FIG. 8B, captured by a camera 71 positioned above the grid, e.g. as depicted in FIG. 7.

FIG. 12 shows example image portions 121a, 121b including respective transport devices 30a, 30b. The image portions 121a, 121b may be extracted from the image 82 based on annotation data, e.g. bounding boxes 120a, 120b, corresponding to detected transport devices 30a, 30b in the image 82. For example, the output annotation data of the method 140 for detecting transport devices in the workspace is used to obtain, e.g. extract, the image portions 121a, 121b from the image 82. Where the annotation data represents one or more bounding boxes, for example, one or more image portions 121a, 121b corresponding to the image data contained in the one or more bounding boxes 120a, 120b overlaid on the annotated image 83 are extracted from the image 82. For example, the method 150 involves obtaining the annotated image data 83, including the annotation data 120a, 120b indicating one or more transport devices in the image, and cropping the annotated image data 83 to produce the one or more image portions 121a, 121b including the respective one or more transport devices 30a, 30b.

In alternative examples, the image portion comprises the entire image 82 captured by the camera 71. The image portion may include one or more transport devices 30. In other words, the image portion comprises at least part of the image 82 captured by the camera 71, for example.

The method 150 further involves processing 152 the obtained image data with a first neural network and a second neural network in succession. The first neural network is trained to detect instances of identification markers on transport devices in images. The second neural network is trained to recognise marker information, associated with identification markers, in images. The identification ("ID") marker is a text label, or other code (such as a barcode, QR code or suchlike) on a transport device, for example. The ID marker includes marker information, e.g. the text or QR code, associated with the marker. The marker information corresponds with ID information for the transport device, e.g. a name or other descriptor, of the transport device in the wider system, for example. The marker information is encoded in the ID marker, e.g. as the text or other code, and the corresponding ID information can be used to distinguish a given transport device from the other transport devices operating in the system.

In examples, the first neural network is configured, e.g. trained or learnt, to receive the image portion as first input data and produce feature vectors as intermediate data, e.g. for transferring to the second neural network as an input thereto. For example, the first neural network comprises a CNN 90 which is configured to use convolutions to extract visual features, e.g. of different sizes, and produce the feature vectors. The "Efficient and Accurate Scene Text" (EAST) detector may be used as the first neural network for identifying the instances of identification markers, e.g. text labels, on the transport devices.

In some cases, the first neural network outputs further annotation data, e.g. defining a bounding box, corresponding to the detected identification marker in the image portion. For example, the processing 152 involves determining, based on the processing with the first neural network, whether the image portion includes an identification marker on the transport device. If the determination is positive, further annotation data corresponding to the location of the identification marker in the image portion is generated and outputted as part of the method 150. The further annotation data may comprise image coordinates relative to the image or image portion. For example, the image coordinates correspond to at least two corners of a bounding box for the identification marker in the image portion. The bounding box can be defined by the coordinates of two opposite corners, for example.

In examples, processing 152 the image data involves extracting a sub-portion of the image portion, the sub-portion corresponding to the detected identification marker on the transport device. For example, the image portion is cropped to generate the sub-portion including the identification marker. FIG. 12 shows an example sub-portion 122 corresponding to the detected identification marker on the transport device 30a as extracted from the image portion 121a. The sub-portion 122 may be rotated such that a longitudinal axis of the identification marker lies substantially horizontal relative to the sub-portion 122, as shown in the example of FIG. 12. The method 150 can then include processing the sub-portion 122 with the second neural network configured, e.g. trained or learnt, to recognise marker information in images.

The method 150 concludes with outputting 153 marker data representative of the marker information determined by the second neural network. For example, the second neural network is configured to derive marker data from the image sub-portion including the ID marker. In examples where the ID marker comprises a text label, the second neural network may be configured to transcribe the image sub-portion including the label into label sequence data, e.g. marker data comprising a sequence (or "string") of letters, digits, punctuation, or other characters. For the example sub-portion 122 shown in FIG. 12, the second neural network would output the marker data as label sequence data "AA-Z82" for the identification label of the transport device 30a, for example. In alternative examples, the ID marker is a code, e.g. a QR ("Quick Response") code or barcode, on the transport device, e.g. applied thereto on a label. The second neural network is configured, e.g. trained or learnt, to determine the code from the image of the ID marker on the transport device, for example. The code, e.g. marker data, can then be output. For example, the code may be further processed to decode the ID information encoded therein. In other words, the detected QR code or barcode is decoded to determine the ID information, e.g. name, of the transport device, for example.

In examples, the second neural network comprises a convolutional recurrent neural network (CRNN), configured to apply convolutions to extract visual features from the image sub-portion and arrange the features in a sequence.

The CRNN comprises two neural networks, for example, a CNN and a further neural network. In some cases, the second neural network includes a bidirectional recurrent neural network (RNN), e.g. a bidirectional long-short term memory (LSTM) model. For example, the bidirectional RNN is configured to process the feature sequence output of the CNN to predict the ID sequence encoded in the marker, e.g. applying sequential clues learned from patterns in the feature sequences-such that the ID sequence is very likely to start with the letter "A" and end with a number in the example of FIG. 12. The second neural network may thus comprise a pipeline of more than one neural network, e.g. a CNN piped to a deep bidirectional LSTM such that the feature sequence output of the CNN is passed to the biLSTM which receives it as input. In other examples, the second neural network comprises a different type of deep learning architecture, e.g. deep neural network.

A detection system may be configured to perform any of the detection methods described herein. For example, the detection system includes an image sensor to capture the images of at least part of the workspace and an interface to obtain the image data. The detection system includes the trained object detection model, e.g. implemented on a graphics processing unit (GPU) or a specialised neural processing unit (NPU), to carry out the processing and determining steps of the computer-implemented method 150 of detecting a an identification marker on a transport device 30.

Determining an Exclusion Zone

Provided herein are methods and systems for determining an exclusion zone in the workspace. The exclusion zone can be implemented by the master controller of the transport devices, and functions to prohibit the transport devices operating in the workspace from entering the exclusion zone. For example, the exclusion zone could be determined around a faulty transport device, e.g. which has fallen over and/or lost communication with the master controller, so that the faulty transport device can be attended to, e.g. retrieved from the workspace, at a later time. This allows the workspace to remain operational while lowering the risk of other transport devices colliding with the faulty transport device. In some cases, the determined exclusion zone can be proposed, e.g. to an operator, before implementation which can help ensure that the determined exclusion zone will cover the actual position of the faulty transport device in the workspace.

Figure 16:
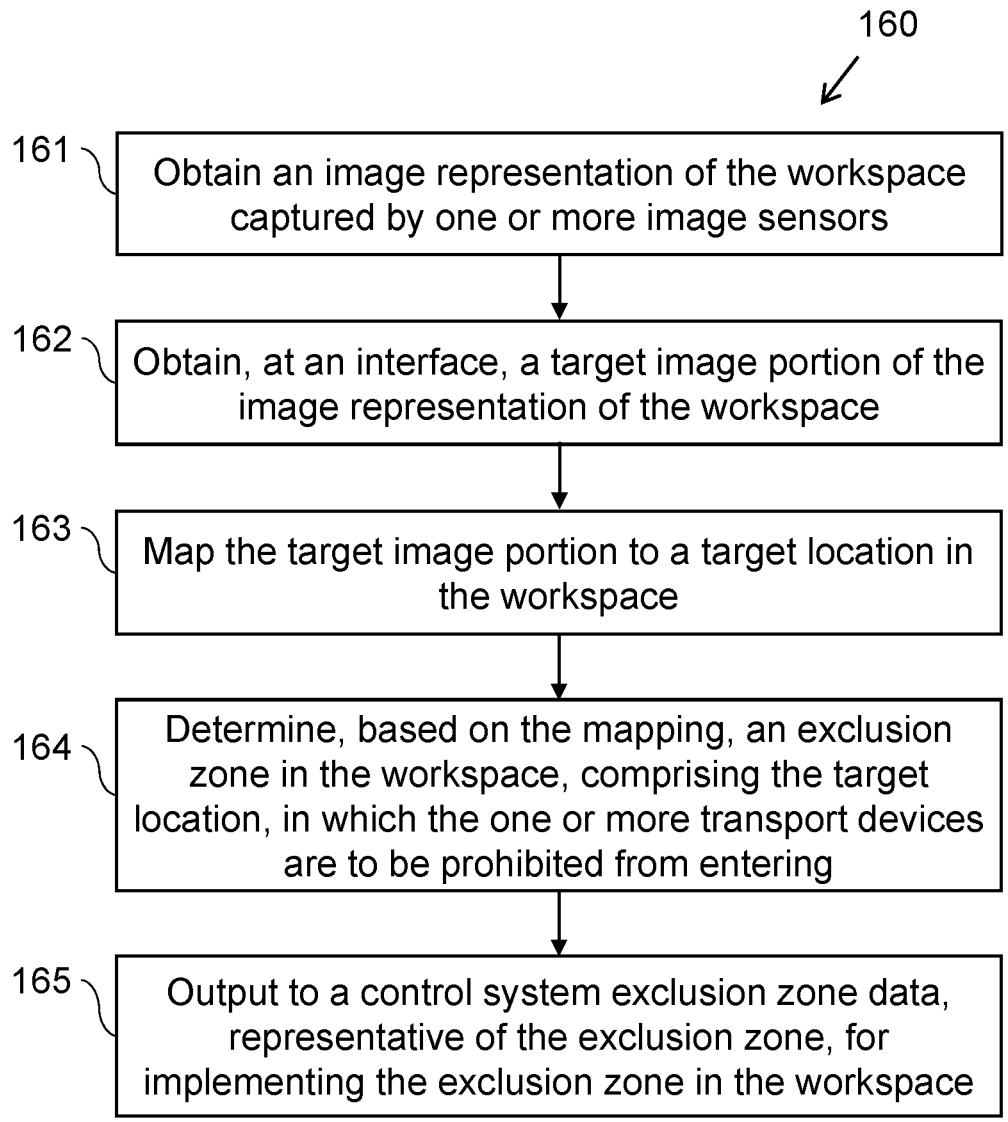
FIG. 16 shows a flowchart depicting a method for assisting the controlling of movement of one or more transport devices operating in a workspace.

FIG. 16 shows a computer-implemented method 160 for assisting the controlling of movement of one or more transport devices 30 operating in a workspace, e.g. the workspace comprising the grid 15 described with reference to FIG. 7.

The method 160 starts with obtaining 161 an image representation of the workspace captured by one or more image sensors. For example, the one or more image sensors are part of one or more cameras 71 with a view of the workspace. The cameras 71 may be disposed above the grid 15 of the workspace as shown in FIG. 7. The image of the workspace is received at an interface, e.g. a camera interface or CSI, communicatively coupled to the one or more image sensors, for example.

A target image portion of the image representation of the workspace is obtained 162 at an interface, e.g. a different interface to the one used to receive the image. The target image portion is mapped 163 to a target location in the workspace. Based on the mapping 163, an exclusion zone in the workspace is determined 164 in which the one or more transport devices are to be prohibited from entering. The exclusion zone includes the target location mapped from the target image portion. Exclusion zone data, representative of the exclusion zone, is output 165 to a control system, e.g. the master controller, for implementing the exclusion zone in the workspace.

For example, a user viewing the image representation of the workspace selects the target image portion via the interface configured to obtain the target image portion. The interface may be a user interface for the user to interact with, for example. The user interface may include a display screen to display the image representation of the workspace captured by the image sensors. The user interface may also include input means, e.g. a touch screen display, keyboard, mouse, or other suitable means, with which the user can select the target image portion.

In examples, the target image portion includes at least part of a faulty transport device in the workspace. For example, the target image portion is a subset of one or more pixels selected from the image of the workspace captured by the image sensors. The one or more pixels correspond to at least part of a faulty transport device shown in the image of the work space. For example, the target image portion includes the whole faulty transport device shown in the image. In other examples, the target image portion is only a single pixel corresponding to a part of the faulty transport device shown in the image.

In other examples, e.g. where the workspace comprises a grid 15 of cells 17, the target image portion corresponds to a given cell in the grid of cells. For instance, the target image portion is a subset of one or more pixels corresponding to at least part of the given cell. In some cases, the target image portion includes the whole cell while in other cases the target image portion is only a single pixel corresponding to a part of the cell.

As described above, in some examples, the user selects the target image portion via the interface, e.g. a user interface. However, in other examples, the target image portion is obtained from an object detection system configured to detect faulty transport devices from images of the workspace. For example, the method 160 involves the object detection system obtaining the image of the workspace captured by the image sensors and determining, using an object classification model, that a faulty transport device is present in the image data.

The object classification model, e.g. object classifier, comprises a neural network in examples, as described in general with reference to FIG. 9, which is taken to apply accordingly. For example, the object classifier is trained with a training set of images of faulty transport devices in the workspace to classify images subsequently captured by the image sensors as containing a faulty transport device in the workspace or not.

For positive classifications by the trained object classifier, the object detection system can then output the target image portion. For example, the object detection system may indicate the target image portion in the original image from the image sensors, e.g. using annotation data such as a bounding box. Alternatively, the object detection system outputs the target image portion as a cropped version of the original input image received from the image sensors, the cropped version including the identified faulty transport device in the workspace.

In examples, the object detection system comprises a neural network trained to detect a faulty transport device and its location in the image data. For example, the object detection system determines a region of the input image in which a faulty transport device is present. The region can then be output as the target image portion, for example. In such cases, the training of the neural network involves using annotated images of the workspace indicating a faulty transport device in the workspace. The neural network is thus trained to both classify an object in the workspace as a faulty transport device, and to detect where the faulty transport device is in the image, i.e. to localise the faulty transport device relative to the image of the workspace.

As described herein, the target image portion output by the object detection system may include at least part of a faulty transport device in the workspace. For example, the target image portion is a subset of one or more pixels selected by the object detection system, e.g. on the basis of a positive localisation of the faulty transport device, from the image captured by the image sensors.

In examples, the determined exclusion zone includes a discrete number of grid spaces. For example, it may be determined that a faulty transport device is located within a single grid space 17 on the grid 15. Thus, the exclusion zone is determined, for example, to extend to that single grid space such that other transport devices are prohibited from entering that grid space. Collisions between the other transport devices and the faulty transport device can thus be prevented. Alternatively, the exclusion zone may be set as a region of grid cells, e.g. a 3×3 cell area, centred on the grid cell at which the faulty transport device is located. Thus, the exclusion zone includes a buffer area around the affected grid cell where the faulty transport device is located. In some cases, the faulty transport device spans more than one grid cell, e.g. where it is positioned between grid cells, has fallen over, or is misaligned with the tracks 22. In such cases, the buffer area around the mapped grid cell (including the target location) can improve the effectiveness of the exclusion zone versus only excluding the mapped grid cell. The size of the buffer area may be predetermined, e.g. as a set area of grid cells to be applied once the mapped grid cell for excluding is determined. Additionally or alternatively, the size of the buffer area is a selectable parameter when implementing the exclusion zone at the control system.

The control system, e.g. master controller, which remotely controls movement of the transport devices operating in the workspace can implement the exclusion zone based on the exclusion zone data output 165 as part of the method 160. For example, each of the one or more transport devices 30 is remotely operable under the control of the control system, e.g. central computer. Instructions can be sent from the control system to the one or more transport devices 30 via a wireless communications network, e.g. implementing one or more base stations, to control movement of the one or more transport devices 30 on the grid 15.

A controller in each transport device 30 is configured to control various driving mechanisms of the transport device, e.g. vehicle 32, to control its movement. For example, the instruction includes various movements in the X-Y plane of the grid structure 15, which may be encapsulated in a defined trajectory for the given transport device. The exclusion zone can thus be implemented by the central control system, e.g. master controller, so that the defined trajectories avoid the exclusion zone represented by the exclusion zone data. For example, when the exclusion zone is implemented, one or more respective trajectories corresponding to one or more transport devices 30 on the grid are updated to avoid the exclusion zone.

In examples, mapping the target image portion (e.g. one or more pixels in the image) to the target location (e.g. a point on the grid structure) involves inversing a distortion of the image of the workspace. For example, where the image sensors are used in combination with an ultra wide-angle lens, the lens distorts the view of the workspace. Thus, the distortion is inversed, for example, as part of the mapping between the image pixels and grid points. An inverse distortion model may be applied to the target image portion for this purpose. The discussion of an image-to-grid mapping algorithm in earlier examples applies here accordingly. For example, mapping the target image portion to the target grid location involves applying the image-to-grid mapping algorithm described herein.

The method 160 of assisting the control system to control transport device movement in the workspace is implemented by an assistance system in embodiments. For example, the assistance system includes one or more image sensors to capture the image representation of the workspace and an interface to obtain the target image portion of the image. The assistance system is configured to perform the mapping 163, determining 164, and output 165 steps of the method 160. For example, the assistance system outputs the exclusion zone data for the control system, e.g. master controller, to receive as input and implement in the workspace. The exclusion zone data may be transferred directly between the assistance system and the control system or may be stored by the assistance system in storage accessible by the control system.

In embodiments employing the assistance system, the object detection system configured to detect faulty transport devices in the workspace is part of the assistance system, for example. The interface of the assistance system may obtain the target image portion from the object detection system, as described in examples.

The assistance system may be incorporated into a storage system 1, e.g. the example shown in FIG. 7, which includes the workspace and control system for controlling transport device movement in the workspace. As described in examples with reference to FIG. 7, the workspace includes a grid 15 formed by a first set 22a of parallel tracks extending in an X-direction, and a second set 22b of parallel tracks extending in a Y-direction transverse to the first set in a substantially horizontal plane. The grid 15 includes multiple grid spaces 17 and the one or more transport devices 30 are arranged to selectively move around on the tracks to handle a container 10 stacked beneath the tracks 22 within a footprint of a single grid space 17. Each transport device 30 may have a footprint that occupies only a single grid space 17 so that a given transport device occupying one grid space does not obstruct another transport device occupying or traversing adjacent grid spaces.

As described in examples, the exclusion zone can correspond to a discrete number of grid spaces 17. For example, the assistance system determines a target location on the grid 15 corresponding to a faulty transport device 30 detected in an image captured by a camera 71 above the grid 15. The target location is converted into grid space coordinates relative to the entire grid, e.g. based on calibration methods described in earlier examples, and an exclusion zone is determined based on the grid space of the target location. For example, the exclusion zone includes at least the grid space of the target location but may include further surrounding grid spaces, e.g. as a buffer area, as described in examples. The control system, e.g. master controller, of the storage system is configured to implement the exclusion zone in the workspace, based on the exclusion zone data determined by the assistance system, so that transport devices 30 operating in the workspace are prohibited from entering the exclusion zone.

The above examples are to be understood as illustrative examples. Further examples are envisaged. For example, the cameras 71 disposed above the grid 15 have been described as ultra wide-angle cameras in many examples. However, the cameras 71 may be wide-angle cameras, which include a wide-angle lens having a relatively longer focal length than an ultra wide-angle lens, but still introduces distortion compared with a normal lens that reproduces a field of view which appears "natural" to a human observer.

Similarly, the described examples include obtaining and processing "images" or "image data". Such images may be video frames in some cases, e.g. selected from a video comprising a sequence of frames. The video may be captured by the camera positioned above the grid as described herein. Thus, the obtaining and processing of images should be interpreted to include obtaining and processing video, e.g. frames from a video stream. For example, the described neural networks may be trained to detect instances of objects (e.g. transport devices, ID markers thereon, etc.) in a video stream comprising a plurality of images. Furthermore, in the described examples involving detecting an ID marker on a transport device, the image data is processed with a first neural network and a second neural network in succession. However, in alternative examples, the first and second neural networks are merged in an end-to-end ID marker detection pipeline or architecture, e.g. as a single neural network. For example, there is also provided a method of detecting an identification marker on a transport device in a workspace comprising a grid formed by a first set of parallel tracks extending in an X-direction, and a second set of parallel tracks extending in a Y-direction transverse to the first set in a substantially horizontal plane, the grid comprising a plurality of grid spaces, wherein one or more transport devices are arranged to selectively move in at least one of the X-direction or Y-direction on the tracks and to handle a container stacked beneath the tracks within a footprint of a single grid space. The method comprises: obtaining image data representative of an image portion including a transport device of the one or more transport devices; processing the image data with at least one neural network trained to detect instances of identification markers on transport devices in images, and to recognise marker information, associated with identification markers, in images; and outputting marker data representative of the marker information determined by the second neural network. In the context of the detection system, according to this alternative example, the one or more processor is configured to implement at least one neural network trained to detect instances of identification markers on transport devices in images, and to recognise marker information, associated with identification markers, in images. The detection system is configured to process the obtained image data with the at least one neural network to generate marker data (e.g. a text string or code) representative of marker information (e.g. a descriptor of the transport device) present on (e.g. encoded in) an identification marker on the transport device, and output the marker data.

Additionally, in described examples regarding localisation of transport devices, the location of the detected transport device 30 on the grid 15 is determinable by comparing the annotation data indicating the detected transport device in the image with further annotation data corresponding to a plurality of virtual transporting devices. In alternative examples, the location of a detected transport device 30 on the grid 15 can be determined in a two step process. Firstly, the plurality of virtual transport devices are filtered, e.g. including calculating intersection over union (IoU) values using the prediction/inference data of the transport device 30 and the annotation data of the all possible locations of the plurality of virtual transport devices. For example, virtual transport devices with calculated IoU values smaller than a predetermined threshold are filtered out. Secondly, all remaining virtual transport devices are sorted (e.g. in ascending order) by a closest distance to a centre of the field of view of the camera, and the first (e.g. closest) virtual transport device is taken as a mapping. The grid location of the transport device 30 is then set to the grid location from which the annotation data of the mapped virtual transport device is created, for example.

In examples employing storage to store data, the storage may be a random-access memory (RAM) such as DDR-SDRAM (double data rate synchronous dynamic random-access memory). In other examples, the storage 330 may include non-volatile memory such as Read-Only Memory (ROM) or a solid-state drive (SSD) such as Flash memory. The storage in some cases includes other storage media, e.g. magnetic, optical or tape media, a compact disc (CD), a digital versatile disc (DVD) or other data storage media. The storage may be removable or non-removable from the relevant system.

In examples employing data processing, a processor can be employed as part of the relevant system. The processor can be a general-purpose processor such as a central processing unit (CPU), a microprocessor, a graphics processing unit (GPU), a digital signal processor (DSP), an application-specific integrated circuit (ASIC), a field-programmable gate array (FPGA) or another programmable logic device, a discrete gate or transistor logic, discrete hardware components, or any suitable combination thereof designed to perform the data processing functions described herein.

In examples involving a neural network, a specialised processor may be employed as part of the relevant system. The specialised processor may be an NPU, a neural network accelerator (NNA) or other version of a hardware accelerator specialised for neural network functions. Additionally or alternatively, the neural network processing workload may be at least partly shared by one or more standard processors, e.g. CPU or GPU.

Although the term "item" has been used throughout the description, it is envisaged to include other terms such as case, asset, unit, pallet, equipment or the like. The term "annotation data" has similarly been used throughout the description. However, the term is envisaged to correspond with prediction data or inference data in alternative nomenclature. For example, the object detection model (e.g. comprising a neural network) may be trained using annotated images, e.g. images with annotations such as bounding boxes, which serve as a ground truth for the model, e.g. a prediction or inference with a confidence of 100% or 1 when normalised. These annotations may be made by a human for the purposes of training the model, for example. Thus, the object detection of the present disclosure can be taken to involve outputting prediction data or inference data (e.g. instead of "annotation data") to indicate a prediction or inference of the transport device in the image. The prediction data or inference data may be represented as an annotation applied to the image, e.g. a bounding box and/or a label. The prediction data or inference data includes a confidence associated with the prediction or inference of the transport device in the image, for example. The annotation can be applied to the image based on the generated prediction data or inference data, for example. For instance, the image may be updated to include a bounding box surrounding the predicted transport device with a label indicating the confidence level of the prediction, e.g. as a percentage value or a normalised value between 0 and 1.

It is also to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

The invention claimed is:

1. A method of calibrating a wide-angle or ultra wide-angle camera disposed above a grid of a storage system, wherein the grid is formed by a first set of parallel tracks extending in an X-direction, and a second set of parallel tracks extending in a Y-direction transverse to the first set in a substantially horizontal plane,
the grid comprising a plurality of grid spaces and arranged to support one or more transport devices, selectively movable in at least one of the X-direction or Y-direction on the tracks, for handling a container stacked beneath the tracks within a footprint of a single grid space,
the method comprising:
obtaining an image of a grid section of the grid captured by the camera;
obtaining initial values of a plurality of parameters corresponding to the camera, the plurality of parameters including a focal length of the camera, a translational vector representative of a position of the camera above the grid section, and a rotational vector representative of a tilt and rotation of the camera;
processing the image, using a neural network trained to detect/predict the first and second sets of parallel tracks in images of grid sections captured by wide-angle or ultra wide-angle cameras, to generate a model of the first and second sets of parallel tracks as captured in the image of the grid section;
mapping selected pixels in the model to corresponding points on the grid using a mapping based on the plurality of parameters, wherein the initial values are used as inputs to the mapping;
determining an error function based on a discrepancy between grid coordinates of the points determined by the mapping and known grid coordinates;
updating the initial values to updated values of the plurality of parameters based on the error function; and
storing the updated values of the plurality of parameters for mapping pixels in images of the grid section captured by the camera to corresponding points on the grid of the storage system via the mapping.

2. The method of claim 1, wherein updating the initial values of the plurality of parameters comprises applying a Broyden-Fletcher-Goldfarb-Shanno algorithm.

3. The method of claim 1, comprising iteratively determining the error function and further updating the updated values of the plurality of parameters until the error function is reduced by less than a predetermined threshold.

4. The method of claim 1, wherein respective boundary values for the plurality of parameters are applied when updating respective values of the plurality of parameters.

5. The method of claim 4, wherein the boundary values for a rotation angle associated with the rotation vector are substantially 0 degrees and substantially +5 degrees.

6. The method of claim 4, wherein the boundary values for a planar component of the translational vector are ±0.6 of a length of a grid cell.

7. The method of claim 4, wherein the boundary values for a height component of the translational vector are 1800 mm and 2100 mm above the grid.

8. The method of claim 4, wherein the boundary values for the focal length are 0.23 and 0.26 cm.

9. The method of claim 1, wherein the storing comprises storing the updated values in a database at a storage location associated with the camera.

10. The method of claim 1, comprising:
processing the image, using an object detection model trained to detect instances of grid cell markers in images of grid sections, to detect a grid cell marker located in a grid cell of the grid section in the image;
extracting grid cell coordinate data encoded in the grid cell marker; and
calibrating grid coordinates, generated by the mapping of pixels in the image to points on the grid, based on the extracted cell coordinate data.

11. The method of claim 1, comprising refining the model of the grid section to represent only centerlines of the first and second sets of parallel tracks, the refining comprising filtering the model with horizontal and vertical line detection kernels.

12. The method of claim 11, wherein the filtering comprises at least one of eroding and dilating pixel values of the model using the horizontal and vertical line detection kernels.

13. The method of claim 11, comprising:
fitting the centerlines to respective quadratic trajectories to produce quadratic centerlines; and
extracting a random subset of pixels from the quadratic centerlines to generate the model.

14. The method of claim 1, wherein the mapping comprises, for a given pixel in the image and corresponding point on the grid:
determining second cartesian coordinates of the corresponding point based on image coordinates of the pixel in the image;
converting the second cartesian coordinates into second polar coordinates;
applying an inverse distortion model to the second polar coordinates to generate first polar coordinates;
converting the first polar coordinates into first cartesian coordinates of the point;
dealigning the point from the cartesian coordinate system in a second plane corresponding to the camera; ands
projecting the point onto a first plane corresponding to the grid from the second plane to determine grid coordinates of the point relative to the grid.

15. The method of claim 14, wherein the inverse distortion model is based on a tangent model of distortion given by:

$$r = f \cdot \tan\left(\frac{r'}{f}\right);$$

wherein r' is the distorted radial coordinate of the point, r is the undistorted radial coordinate of the point, and f is the focal length of the camera.

16. The method of claim 14, wherein determining the second cartesian coordinates comprises initializing the pixel in the image, including at least one of centering or normalizing the image coordinates.

17. The method of claim 14, wherein determining the second cartesian coordinates comprises inverting the ordinate of the image coordinates.

18. The method of claim 14, wherein dealigning the point from the cartesian coordinate system comprises applying a rotational transformation to the point to align the point with an orientation of the grid in the image.

19. The method of claim 14, wherein projecting the point onto the first plane corresponding to the grid comprises computing:

$$p = B^{-1} \cdot (f \cdot t - q \cdot z);$$

wherein:

$$B = q \cdot R_{3,[1,2]} - f \cdot R_{[1,2],[1,2]};$$

wherein p comprises point coordinates in the first plane corresponding to the grid, f is the focal length of the camera, t is a planar translation vector, q comprises the first cartesian coordinates in the second plane, z is a distance between the camera and the grid, and R is a three-dimensional rotation matrix related to a rotation vector.

20. A calibration system for calibrating a wide-angle or ultra wide-angle camera disposed above a grid of a storage system, wherein the grid is formed by a first set of parallel tracks extending in an X-direction, and a second set of parallel tracks extending in a Y-direction transverse to the first set in a substantially horizontal plane, the grid comprising a plurality of grid spaces and arranged to support one or more transport devices, selectively movable in at least one of the X-direction or Y-direction on the tracks, for handling a container stacked beneath the tracks within a footprint of a single grid space, the calibration system comprising:
  at least one interface to obtain an image of a grid section of the grid captured by the camera, and obtain initial values of a plurality of parameters corresponding to the camera, the plurality of parameters including a focal length of the camera, a translational vector representative of a position of the camera above the grid section, and a rotational vector representative of a tilt and rotation of the camera; and
  at least one processor configured to:
    process the image, using a neural network trained to detect/predict the first and second sets of parallel tracks in images of grid sections captured by a wide-angle or ultra wide-angle cameras, to generate a model of the first and second sets of parallel tracks as captured in the image of the grid section;
    map pixels in the model to corresponding points on the grid using a mapping based on the plurality of parameters, wherein the initial values are used as inputs to the mapping;
    determine an error function based on a discrepancy between grid coordinates of the points determined by the mapping and known grid coordinates;
    update the initial values to updated values of the plurality of parameters based on the error function; and
    output the updated values of the plurality of parameters to storage for mapping pixels in images of the grid section captured by the camera to corresponding points on the grid of the storage system via the mapping.

21. The calibration system of claim 20, wherein the at least one processor is configured to:
  process the image, using an object detection model trained to detect instances of grid cell markers in images of grid sections, to detect a grid cell marker located in a grid cell of the grid section in the image;
  extract grid cell coordinate data encoded in the grid cell marker; and
  calibrate grid coordinates, generated by the mapping of pixels in the image to points on the grid, based on the extracted cell coordinate data.

22. The calibration system of claim 21, wherein the grid cell marker comprises a signboard with the cell coordinate data marked on the signboard.

23. The calibration system of claim 20, wherein the mapping comprises, for a given pixel in the image and corresponding point on the grid:
  determining second cartesian coordinates of the corresponding point based on image coordinates of the pixel in the image;
  converting the second cartesian coordinates into second polar coordinates;
  applying an inverse distortion model to the second polar coordinates to generate first polar coordinates;
  converting the first polar coordinates into first cartesian coordinates of the point;
  dealigning the point from the cartesian coordinate system in a second plane corresponding to the camera; and
  projecting the point onto a first plane corresponding to the grid from the second plane to determine grid coordinates of the point relative to the grid.

24. The calibration system of claim 23, wherein the inverse distortion model is based on a tangent model of distortion given by:

$$r = f \cdot \tan\left(\frac{r'}{f}\right);$$

wherein r' is the distorted radial coordinate of the point, r is the undistorted radial coordinate of the point, and f is the focal length of the camera.

25. The calibration system of claim 20, wherein the neural network comprises a convolutional neural network.

* * * * *